US012674396B2

(12) United States Patent
Yadav et al.

(10) Patent No.: US 12,674,396 B2
(45) Date of Patent: Jul. 7, 2026

(54) COMPOSITE AIRFOIL ASSEMBLY HAVING A TIP CAP

(71) Applicant: GENERAL ELECTRIC COMPANY, Evendale, OH (US)

(72) Inventors: Abhijeet Jayshingrao Yadav, Bangalore (IN); Frank Worthoff, West Chester, OH (US); Nicholas Joseph Kray, Mason, OH (US); Nitesh Jain, Bangalore (IN); Balaraju Suresh, Bangalore (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/055,681

(22) Filed: Feb. 18, 2025

(65) Prior Publication Data

US 2025/0188844 A1 Jun. 12, 2025

Related U.S. Application Data

(63) Continuation of application No. 18/476,474, filed on Sep. 28, 2023, now abandoned.

(30) Foreign Application Priority Data

Aug. 16, 2023 (IN) .............................. 202311054848

(51) Int. Cl.
F01D 5/28 (2006.01)
F02C 7/00 (2006.01)
(52) U.S. Cl.
CPC ................ F01D 5/282 (2013.01); F02C 7/00 (2013.01); F05D 2240/307 (2013.01)

(58) Field of Classification Search
CPC ..... F01D 5/147; F01D 5/282; F05D 2240/307
See application file for complete search history.

(56) References Cited

U.S. PATENT DOCUMENTS

| | | | | |
|---|---|---|---|---|
| 1,022,203 A | * | 4/1912 | Nettle | F04D 29/30 416/236 R |
| 1,862,827 A | * | 6/1932 | Carnegie | F01D 5/146 415/168.1 |
| 3,012,709 A | * | 12/1961 | Schnell | F04D 29/324 416/236 R |
| 4,274,806 A | | 6/1981 | Gallardo, Jr. | |
| D273,037 S | | 3/1984 | Dodge | |
| 6,733,240 B2 | | 5/2004 | Gliebe | |
| 8,241,003 B2 | | 8/2012 | Roberge | |
| 8,939,705 B1 | | 1/2015 | Lee et al. | |

(Continued)

FOREIGN PATENT DOCUMENTS

| | | |
|---|---|---|
| CA | 1798754 A1 | 6/2013 |
| CA | 2798754 A1 | 6/2013 |

(Continued)

*Primary Examiner* — Courtney D Heinle
*Assistant Examiner* — Cameron A Corday
(74) *Attorney, Agent, or Firm* — McGarry Bair PC

(57) ABSTRACT

A composite airfoil assembly for a turbine engine. The turbine engine has a fan section, a compressor section, a combustion section, and a turbine section in serial flow arrangement. The composite airfoil assembly has an outer wall, a composite body, and a tip cap. The composite body at least partially defines the outer wall. The tip cap at least partially defines the outer wall.

13 Claims, 16 Drawing Sheets

(56)     References Cited

U.S. PATENT DOCUMENTS

| 10,174,625 | B2 | 1/2019 | Benson |
| 10,408,224 | B2 | 9/2019 | Strock et al. |
| 10,605,087 | B2 | 3/2020 | Xu et al. |
| 11,215,054 | B2 | 1/2022 | Stilin |
| 12,037,938 | B1 | 7/2024 | Kray |
| 2010/0296942 | A1 | 11/2010 | Jevons |
| 2014/0050893 | A1 | 2/2014 | Paige et al. |
| 2019/0186271 | A1* | 6/2019 | Xu .......................... F01D 5/142 |
| 2019/0242260 | A1 | 8/2019 | Kray et al. |
| 2019/0242399 | A1 | 8/2019 | Kray et al. |
| 2019/0368361 | A1 | 12/2019 | Kray et al. |
| 2020/0182062 | A1 | 6/2020 | Gemeinhardt et al. |
| 2021/0131294 | A1 | 5/2021 | Stilin |
| 2022/0136394 | A1* | 5/2022 | Stilin ....................... F01D 5/20 |
| | | | 416/230 |
| 2023/0003129 | A1 | 1/2023 | Jain |

FOREIGN PATENT DOCUMENTS

| EP | 1980714 | B1 | 6/2016 |
| EP | 3816398 | A1 | 5/2021 |
| EP | 3816399 | A1 | 5/2021 |

* cited by examiner

100

300

COMPOSITE AIRFOIL ASSEMBLY HAVING A TIP CAP

CROSS-REFERENCE TO RELATED APPLICATION(S)

This application claims priority to Indian Provisional Application 202311054848, filed Aug. 16, 2023, and U.S. patent application Ser. No. 18/476,474, filed Sep. 28, 2023, which are incorporated herein by reference in its entirety.

TECHNICAL FIELD

The disclosure generally relates to a composite airfoil assembly, and more specifically to a tip cap for the composite airfoil assembly.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel and ignited in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section, and the turbine section, respectively. The rotation of the rotating blades imparts mechanical stresses along various portions of the blade; specifically, where the blade is mounted to the disk.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
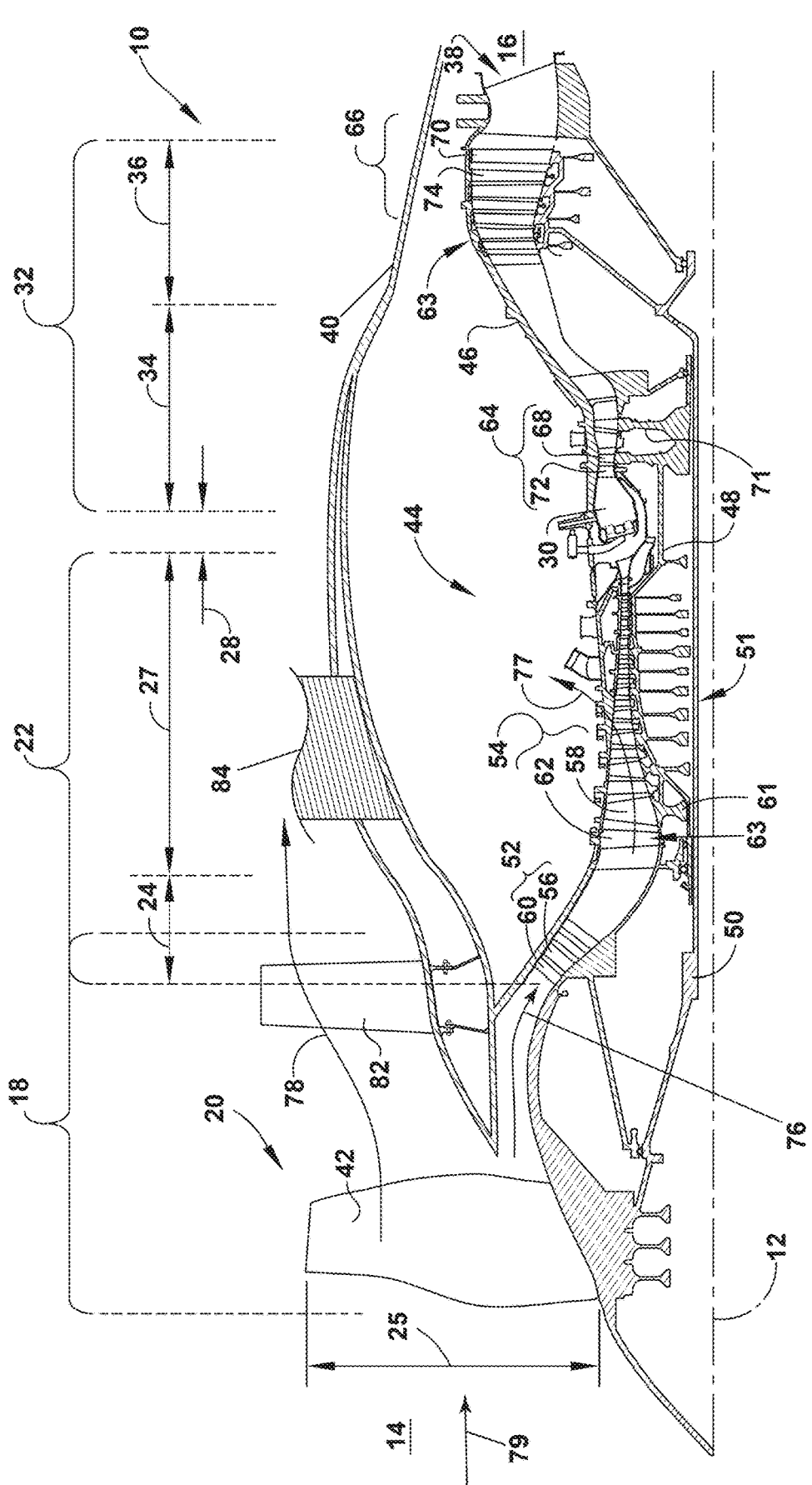
FIG. 1 is a schematic cross-sectional view of a turbine engine, the turbine engine being an unducted or open rotor turbine engine accordance with an exemplary embodiment of the present disclosure.

Aspects of the disclosure herein are directed to an airfoil assembly for a turbine engine. The airfoil assembly includes an outer wall, a tip cap, and a body. The outer wall is at least partially defined by the tip cap and the body. The outer wall defines a pressure side and a suction side of the airfoil assembly. The tip cap is provided along at least a portion of the suction side, the pressure side and a tip of the airfoil assembly. The body can be a composite body such that the airfoil assembly can be a composite airfoil assembly.

The tip cap is used to provide additional stiffness along the tip of the airfoil assembly to reduce tip deflection and strains during operation of the airfoil assembly. The tip cap can be designed in a lightweight manner so as to not weigh down the airfoil assembly at the tip, causing an unbalance in the airfoil assembly. The tip cap can further enhance the aerodynamic properties of the airfoil assembly. For purposes of illustration, the present disclosure will be described with respect to an airfoil assembly for a turbine engine, specifically a fan blade of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked composite plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity.

The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 27, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially from and circumferentially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 27. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and coupled to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 27, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP spools 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor 51 refers to the combination of rotating elements throughout the unducted turbine engine 10.

Complementary to the rotary portions, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

It will be appreciated that the unducted turbine engine 10 can be split into at last two separate portions; a rotor portion and a stator portion. The rotor portion can be defined as any portion of the unducted turbine engine 10 that rotates about a respective rotational axis. the stator portion can be defined by a combination of non-rotating elements provided within the unducted turbine engine 10. As a non-limiting example, the rotor portion can include the plurality of fan blades 42, the compressor blades 56, 58, or the turbine blades 68, 70. As a non-limiting example, the stator portion can include the plurality of fan vanes 82, the static compressor vanes 60, 62, or the static turbine vanes 72, 74.

During operation of the unducted turbine engine 10, a freestream airflow 79 flows against a forward portion of the unducted turbine engine 10. A portion of the freestream airflow 79 enters an annular area 25 defined by a swept area between an outer surface of the nacelle 40 and the tip of the fan blade 42, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 27, which further pressurizes the air. The working airflow 76, or the pressurized airflow, from the HP compressor 27 is mixed with fuel in the combustor 30 and ignited, thereby generating combustion gases. Some work is extracted from these gases by the HP turbine 34, which drives the HP compressor 27. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42, over at least a portion of the set of stationary fan vanes 82, and the nacelle 40 of the unducted turbine engine 10. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 27.

Figure 2:
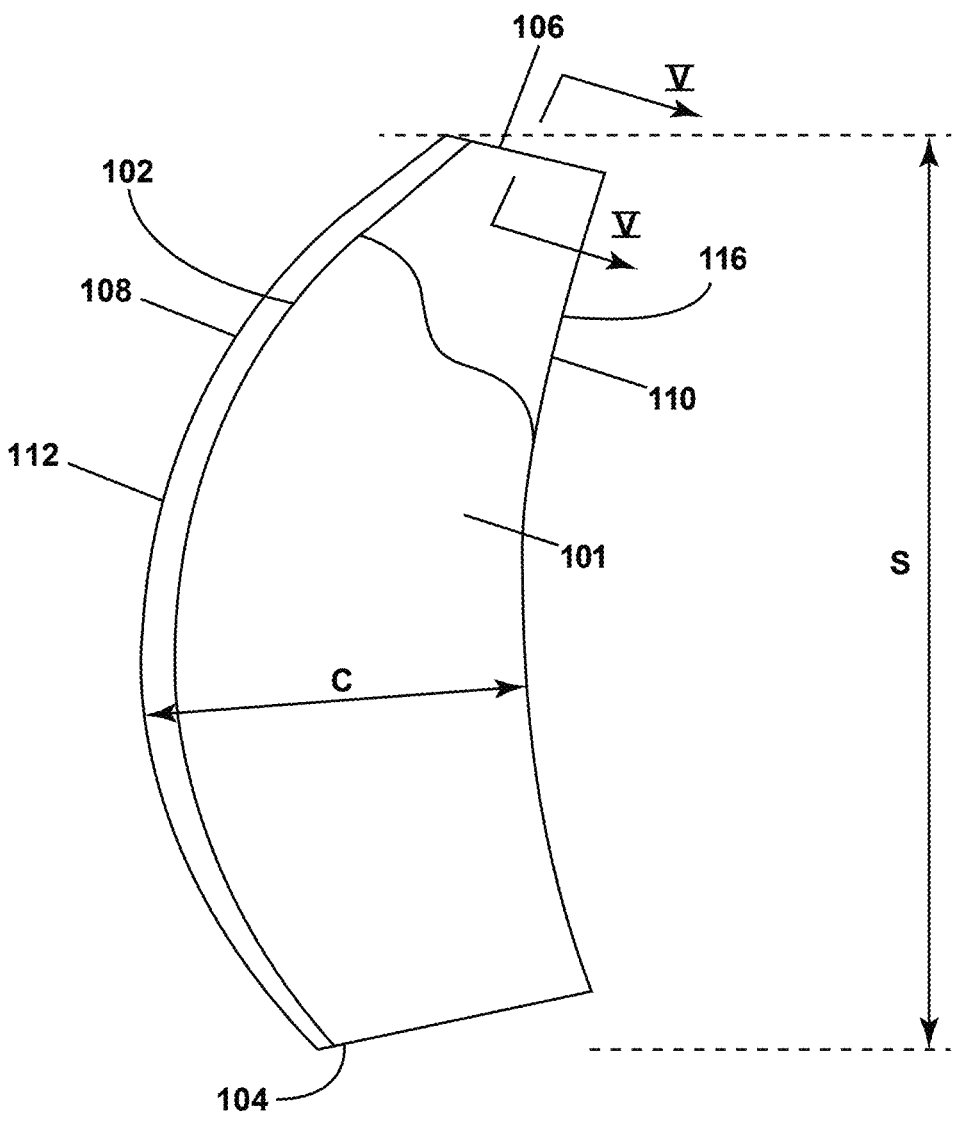
FIG. 2 is a schematic illustration of an airfoil assembly suitable for use within the turbine engine of FIG. 1, the airfoil assembly including a composite body, a tip, and a tip cap.

FIG. 2 is schematic illustration of an airfoil assembly 100 suitable for use within the unducted turbine engine 10 of FIG. 1. The airfoil assembly 100 can be any suitable airfoil of the unducted turbine engine 10. As a non-limiting example, the airfoil assembly 100 can be a blade of the plurality of fan blades 42, or a blade from the compressor blades 56, 58 or the turbine blades 68, 70. In the instance where the airfoil assembly 100 is a blade, the airfoil assembly 100 can be provided within the rotor portion of the unducted turbine engine 10. It is contemplated that the airfoil assembly 100 can be a blade, vane, airfoil, or other component of any suitable turbine engine, such as, but not limited to, a gas turbine engine, a turboprop engine, a turboshaft engine, a ducted turbofan engine, or the unducted turbine engine 10.

The airfoil assembly 100 can be defined by an assembly of parts. As a non-limiting example, the airfoil assembly 100 can include a body 102 and a tip cap 116. The body 102 and the tip cap 116, together, can define an outer wall 101. The outer wall 101 can extend between a leading edge 108 and a trailing edge 110 in a chordwise direction (C). The outer wall 101 can extend between a root 104 and a tip 106 in a spanwise direction (S). The tip cap 116 can define at least a portion of the tip 106.

A cladding 112 can be provided along at least a portion of the leading edge 108. It is contemplated that at least a portion of the trailing edge 110 can include a respective cladding.

The body 102, the tip cap 116 and the cladding 112 can be any suitable material. It will be appreciated that at least a portion of the airfoil assembly 100 can include a composite material. As such, the airfoil assembly 100 can be defined as a composite airfoil assembly.

As a non-limiting example, at least a portion of the body 102 can include a woven composite material, a braided composite material, a 3D or 2D preform composite material, or any combination thereof. As a non-limiting example, the body 102 can include a polymeric portion formed of a PMC including, but not limited to, a matrix of thermoset (epoxies, phenolics) or thermoplastic (polycarbonate, polyvinylchloride, nylon, acrylics) and embedded glass, carbon, steel, or Kevlar fibers. As a non-limiting example, the body 102 can include carbon or carbon fibers, glass or glass fibers, nylon, rayon, or aramid fibers, while other materials such as nickel, titanium, ceramic composite, or a combination thereof. The body 102 can further include multiple components. As a non-limiting example, the body 102 can include a core (not illustrated), such as a woven core, and a laminate skin (not illustrated) provided over the core. The laminate skin can define the outer wall 101. The laminate skin can be formed as a set of laminate layers, provided around or about the core. The laminate skin can be pre-impregnated, fiber placed, or formed of dry fiber laminate layers, in non-limiting examples. Such laminate layers forming the laminate skin can be formed by resin transfer molding (RTM), partial RTM, same qualified resin transfer molding (SQRTM), or out-of-autoclave in non-limiting examples. The core can include a core bulk modulus and the laminate skin can include a skin bulk modulus. The skin bulk modulus can be different than the core bulk modulus. As a non-limiting example, the skin bulk modulus can be greater than the core bulk modulus.

As a non-limiting example, the cladding 112 can include a metallic material. As a non-limiting example, the tip cap 116 can include a metallic material. As a non-limiting example, the tip cap 116 can include any suitable material such as, but not limited to, aluminum, titanium, a steel alloy, or a combination thereof. As a non-limiting example, the body 102 can include a composite material.

It is contemplated that the tip cap 116 can include a first density, while the body 102 can include a second density. The first density can be larger than the second density such that the tip cap 116 can add a noticeable weight to the tip 106 of the airfoil assembly 100.

Figure 3:
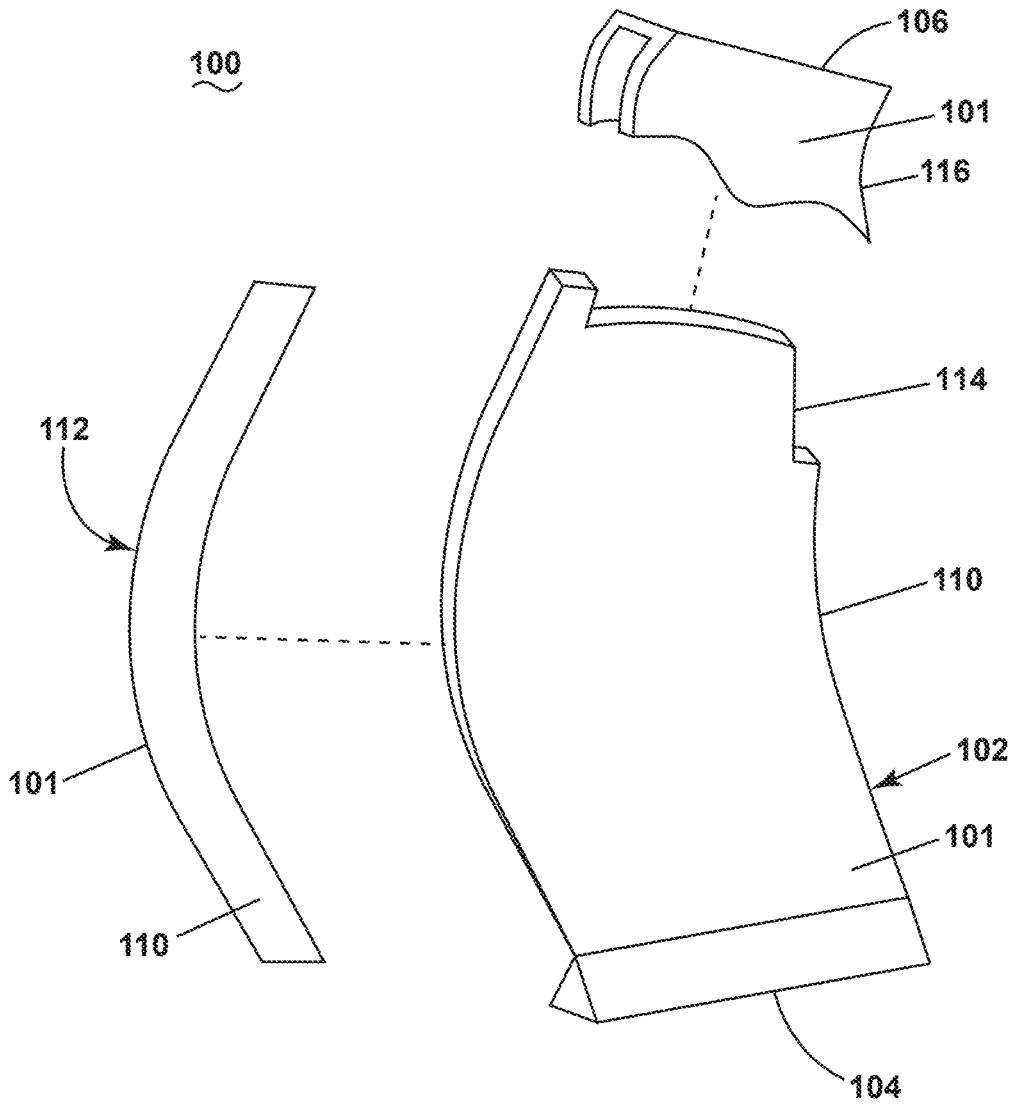
FIG. 3 is a schematic, exploded, isometric view of the airfoil assembly of FIG. 2.

FIG. 3 is a schematic, exploded isometric view of the airfoil assembly 100 of FIG. 2 with the cladding 112 and the tip cap 116 removed from the body 102. The tip cap 116 and the cladding 112 can each fit over a respective portion of the body 102. As illustrated, the tip cap 116 can form an inverted u-shape such that the tip cap 116 can be placed over the body 102. It is contemplated that at least a portion of the tip cap 116 can at least partially surround or overlay a portion of the body 102 corresponding to the trailing edge 110 or the leading edge 108. The body 102 can be shaped to accept or otherwise form a seat 114 for at least one of the tip cap 116 or the cladding 112.

Figure 4:
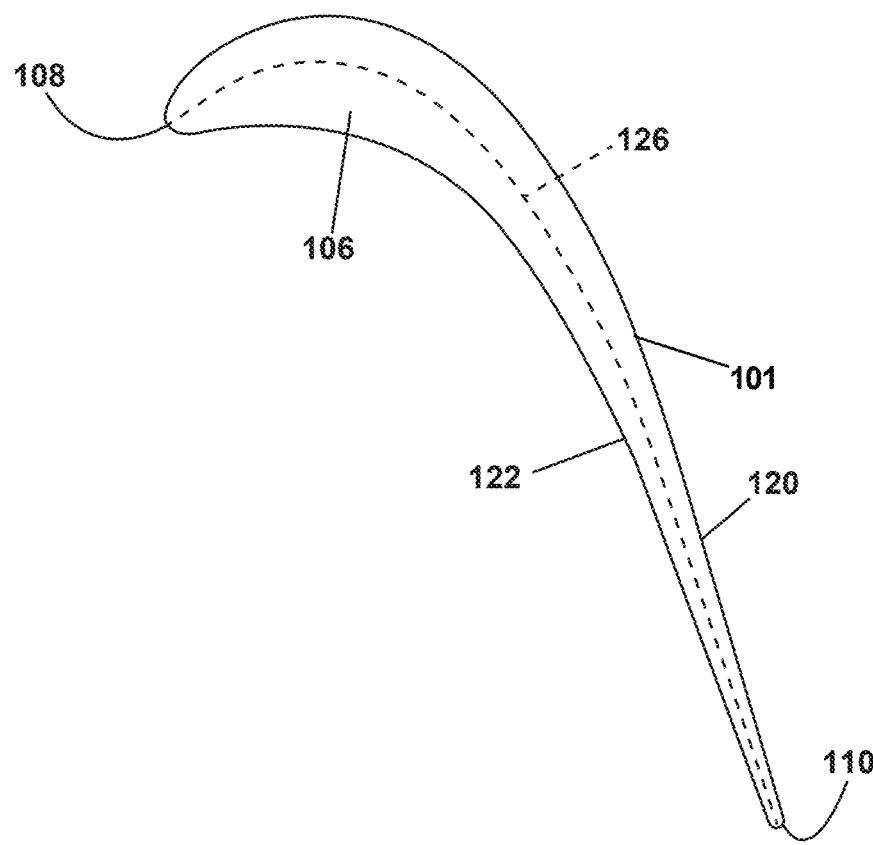
FIG. 4 is a top-down schematic illustration of the airfoil assembly of FIG. 2, further illustrating a pressure side, a suction side and a camber line.

FIG. 4 is a top-down schematic view of the airfoil assembly 100 as seen along the tip 106. The outer wall 101 defines a suction side 120 and a pressure side 122. A camber line 126 extends through the airfoil assembly 100 between the leading edge 108 and the trailing edge 110. The camber line 126 is equidistant between opposing portions of the outer wall 101 defining the pressure side 122 and the suction side 120.

Figure 5:
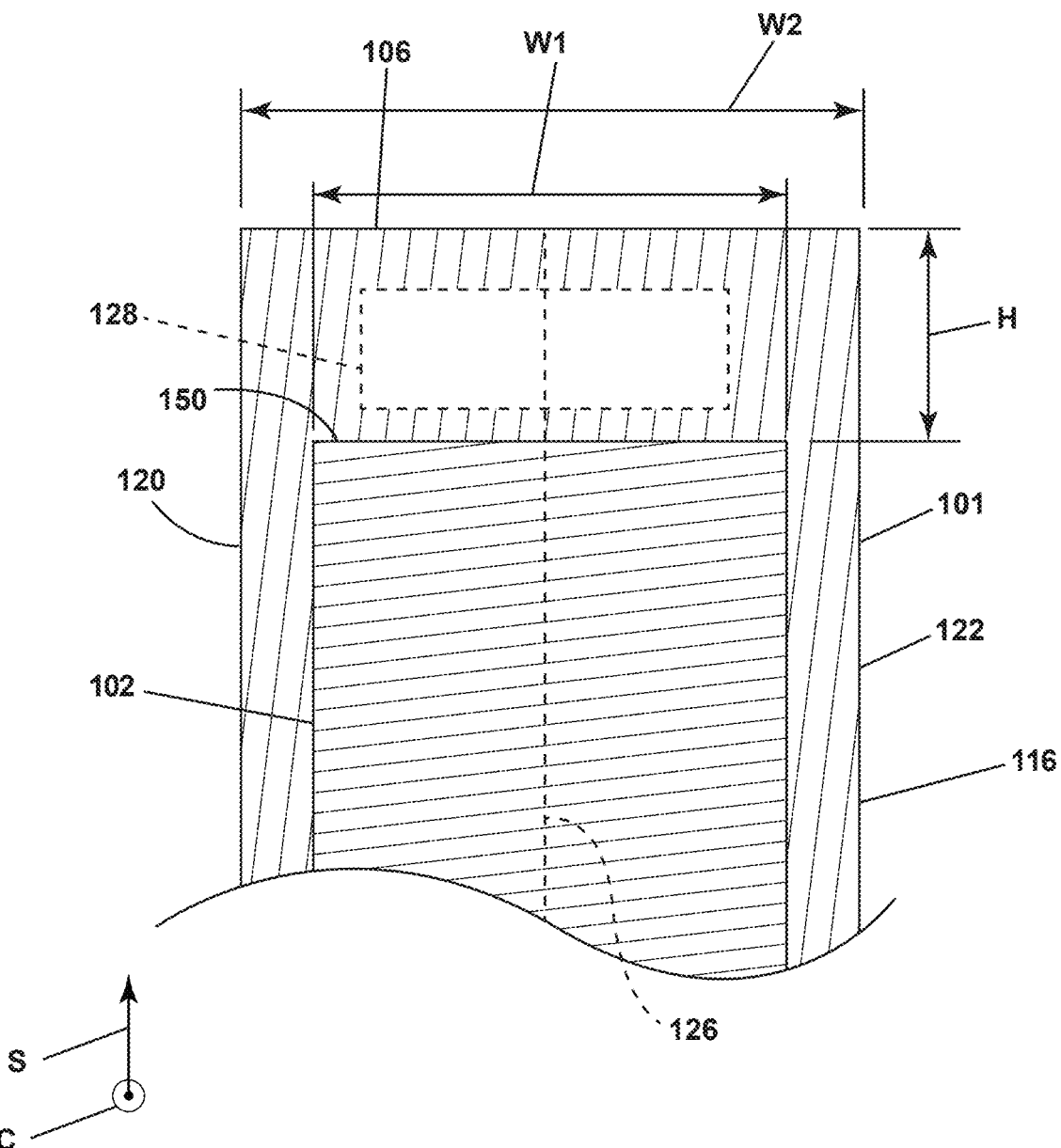
FIG. 5 is a schematic cross-sectional view of the airfoil assembly as seen from sectional line V-V of FIG. 2, further illustrating the tip cap overlying a portion of the tip.

FIG. 5 a schematic cross-sectional view of the airfoil assembly 100 as seen from sectional line V-V of FIG. 2. The illustration is taken along a plane extending along the camber line 126 in the span-wise direction, the plane intersecting the root 104 (FIG. 2) and the tip 106 at a same percentage between the leading edge 108 (FIG. 2) and the trailing edge 110 (FIG. 2).

The body 102 can terminate prior to the tip 106 at a distal end 150. The tip cap 116 can overly a portion of the body 102. As a non-limiting example, the tip cap 116 can overly a portion of the body 102 corresponding to the pressure side 122 of the airfoil assembly 100, the suction side 120 of the airfoil assembly 100 and the distal end 150. The tip cap 116 extends axially over, with respect to the camber line 126, a respective portion of the body 102 corresponding to the suction side 120 and the pressure side 122 of the airfoil assembly 100. The tip cap 116 extends radially over, with respect to the camber line 126, a respective portion of the body 102.

The tip cap 116 can extend across an entirety of the distal end 150. The tip cap 116 can be formed as a unitary body extending continuously along the tip between the suction side 120 and the pressure side 122. The distal end 150 can extend a first width (W1) between radially opposing sides of the body 102, with respect to the camber line 126. The tip cap 116 can extend along radially the tip 106 a second width (W2), with respect to the camber line 126. The second width (W2) can be greater than or equal to the first width (W1).

The tip cap 116 can include an area of increased thickness defined by a height (H) extending in the spanwise direction (S) (FIG. 2). The height (H) can be any suitable size. As a non-limiting example, the height (H) can be greater than 0% and less than or equal to 15% of a maximum length of the airfoil assembly 100 in the spanwise direction (S). As a non-limiting example, the height (H) can be greater than or equal to 4% and less than or equal to 15% of the maximum length of the airfoil assembly 100 in the spanwise direction (S). A void defining a hollow interior 128 can be provided within a portion of the tip cap 116. As a non-limiting example, the hollow interior 128 can be provided within the area of increased thickness defined by the height (H). The hollow interior 128 is illustrated in phantom lines, as such it will be appreciated that the tip cap 116 can be formed as a solid material without the hollow interior 128. The hollow interior 128 can be used to reduce a weight of the tip cap 116. It is further contemplated that the hollow interior 128 can be used for cooling purposes. As a non-limiting example, a cooling fluid can be supplied to the hollow interior 128 to effectively cool the tip cap 116 during operation of the airfoil assembly 100.

During operation, an external force can be applied to the airfoil assembly 100. As a non-limiting example, the external force can be, but is not limited to, a working airflow flowing over the airfoil assembly 100. The tip cap 116 can provide structural support to the body 102 and shield at least a portion of the body 102 from the external forces. As a non-limiting example, the tip cap 116 can provide stiffness in the chordwise direction (C) (FIG. 2) and along a thickness between the pressure side 122 and the suction side 120 of the outer wall 101. Specifically, the tip cap 116 defines a solid or otherwise a region of the airfoil assembly 100 with a higher density than the body 102, which in turn makes it difficult to bend the tip cap 116, and hence the airfoil assembly 100, in the chordwise direction (C). Further, under some circumstances, the external force can be oriented in such a way or large enough to cause the tip to deflect in a direction of the external force if the tip cap 116 were not included. The tip cap 116 has been found to reduce and or eliminate the deflection of the tip.

Figure 6:
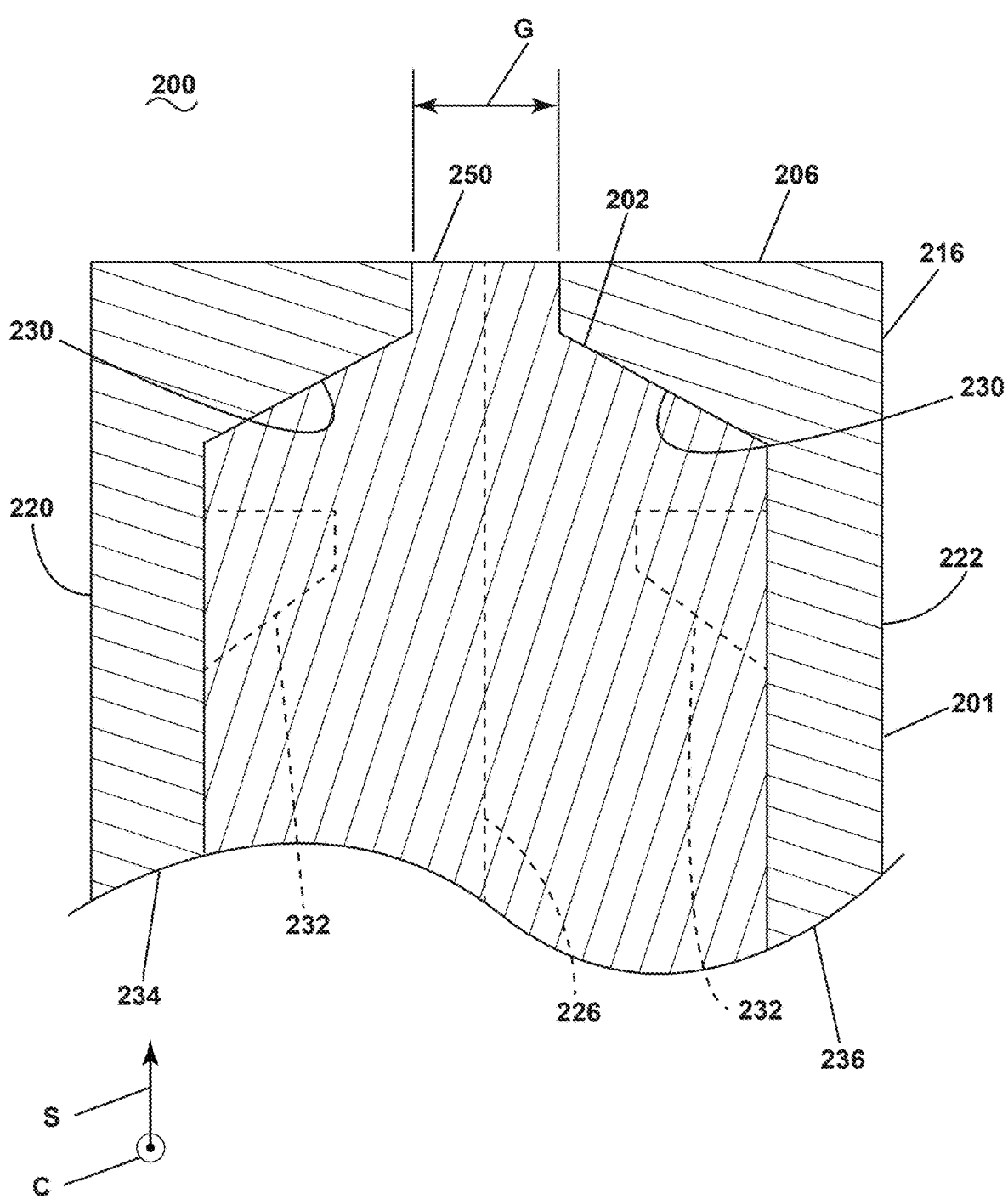
FIG. 6 is a schematic cross-sectional view of an exemplary airfoil assembly suitable for use as the airfoil assembly of FIG. 2, further illustrating the tip cap including a first body, a second body, and at least one interior rib.

FIG. 6 is a schematic cross-sectional view of an exemplary airfoil assembly 200 suitable for use as the airfoil assembly 100 of FIG. 2. The airfoil assembly 200 is similar to the airfoil assembly 100; therefore, like parts will be identified with like numerals increased to the 200 series, with it being understood that the description of the airfoil assembly 100 applies to the airfoil assembly 200 unless noted otherwise.

The airfoil assembly 200 includes an outer wall 201 terminating at a tip 206. The outer wall 201 defines a suction side 220, a pressure side 222, and a camber line 226. The outer wall 201 extends in a spanwise direction (S) and a chordwise direction (C). The airfoil assembly 200 includes a body 202 (e.g., a composite body) and a tip cap 216, with both at least partially defining the outer wall 201. The body 202 terminates at a distal end 250.

The airfoil assembly 200 is similar to the airfoil assembly 100 (FIG. 2), in that the tip cap 216 at least partially overlays a portion of the body 202 corresponding to the tip 206, the suction side 220 and the pressure side 222. The airfoil assembly 200, however, includes a tip cap 216 having a plurality of bodies; a first body 234 and a second body 236. At least a portion of the tip cap 216 is discontinuous. As a non-limiting example, the first body 234 can be radially spaced from the second body 236 along the tip 206. In other words, a gap (G) can be provided between the first body 234 and the second body 236 along a portion of the tip 206. The plurality of bodies can be symmetric or asymmetric about the camber line 226. A portion of the body 202 can extend into the gap (G) such that the body 202 at least partially defines the tip 206.

The tip cap 216 extends axially over, with respect to the camber line 226, a respective portion of the body 202 corresponding to the suction side 220 and the pressure side 222 of the airfoil assembly 200. The tip cap 216 extends radially over, with respect to the camber line 226, a respective portion of the body 202.

It will be appreciated that the first body 234 can be coupled to the second body 236. As a non-limiting example, a bar (not illustrated) can extend through the gap (G) between the first body 234 and the second body 236 and effectively couple the first body 234 to the second body 236. In other words, an additional body (e.g., the bar) can extend from the first body 234 to the second body 236 through the gap (G). the additional body can be coupled to each of the first body 234 and the second body 236 such that the additional body couples the first body 234 to the second body 236. Alternatively, the gap (G) can be eliminated at certain portions of the tip cap 216 such that the first body 234 and the second body 236 are integrally formed or coupled to one another at one or more portions of the tip cap 216, but removed from (e.g., the gap (G) is formed therebetween) at another portion.

The tip cap 216 can include a set of interior ribs 230. The set of interior ribs 230 can define a portion of the tip cap 216 that extends radially towards the camber line 226. The set of interior ribs 230, as illustrated, are formed along a portion of the tip cap 216 that extends along the tip 206. The set of interior ribs 230 can have any suitable shape when viewed along a plane extending along the camber line 226 intersecting the root (e.g., the root 104 of FIG. 2) and the tip 206 at a same percentage between the leading edge (e.g., the leading edge 108 of FIG. 2) and the trailing edge (e.g. the trailing edge 108 of FIG. 2). As a non-limiting example, the set of interior ribs 230 can include a trapezoidal, rectangular, circular, triangular, or any combination therefor cross-sectional area.

The set of interior ribs 230 can further include an additional set of interior ribs 232 which extend into the body 202 and are axially displaced from the tip 206. The additional set of interior ribs 232 can extend radially into the body 202. The additional set of interior ribs 232 can be used as a method of coupling the tip cap 216 to the body 202. As a non-limiting example, the additional set of interior ribs 232 can hold the tip cap 216 in frictional contact with the body 202, or at least a portion of the tip cap 216 can be coupled to the body through any other suitable method such as, but not limited to, bonding, welding, adhesion, fastening, or any combination thereof.

It is contemplated that the set of interior ribs 230 can further be used as a set of stress risers for the body 202. As a non-limiting example, the body 202 can include a series of composite plies radially stacked on top of each other. The set of interior ribs 230 can extend through one or more of the composite plies, thus making at least a portion of the composite plies of the body 202 discontinuous. It is contemplated that this discontinuity of one or more of the composite plies of the body 202 can, in turn, invoke tip frangibility, which in some systems may be desired.

It is contemplated that the tip cap 216 can be used in place of the tip cap 116 for manufacturing purposes. For example, the tip cap 116 can require being formed as a unitary body, while the tip cap 216 can be formed as two separate bodies. Nonetheless, it is contemplated that the tip cap 216 can include the set of interior ribs 230 such that the increased stiffness of the airfoil assembly 200 in the chordwise direction (C) is still achieved. The set of interior ribs 230 increases the thickness of the tip cap 216, which in turn increases the tip cap's 216 resilience to bending.

Figure 7:
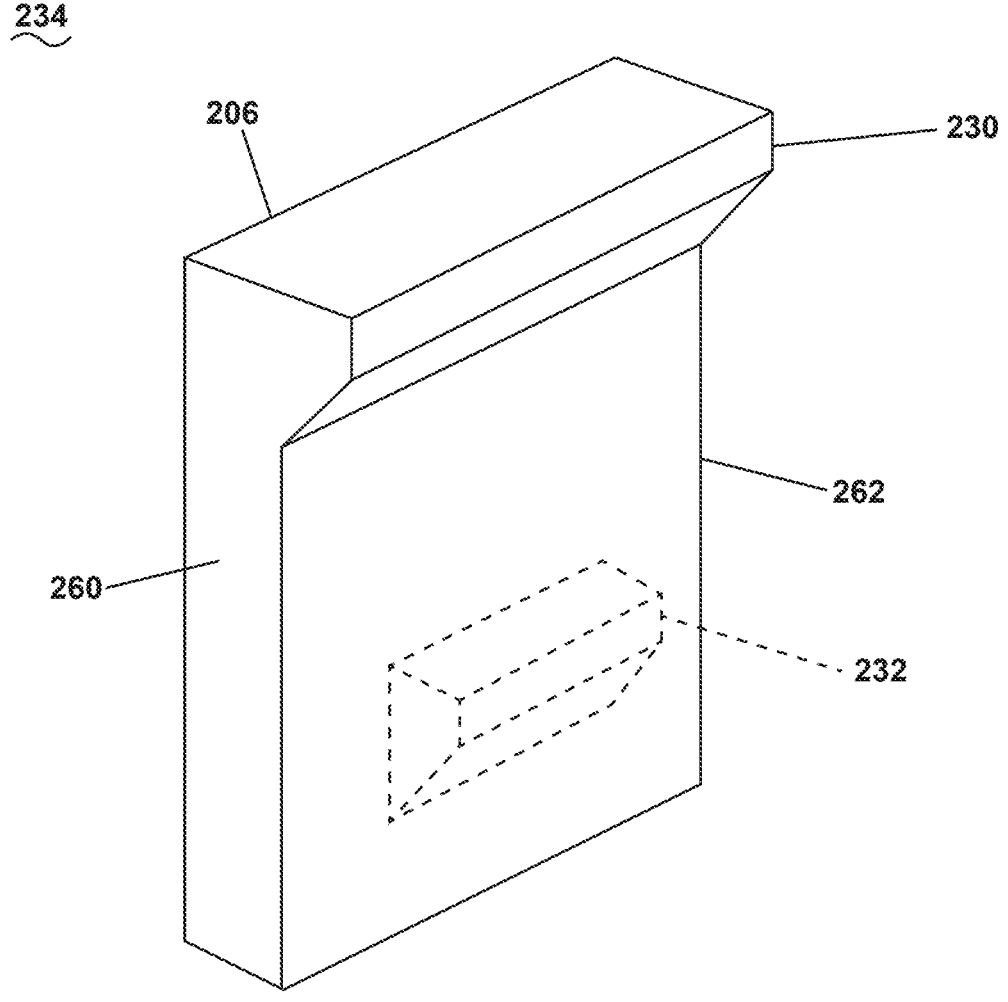
FIG. 7 is a schematic isometric view of the tip cap of FIG. 6, further illustrating the first body of the tip cap.

FIG. 7 is a schematic isometric view of the first body 234 of the tip cap 216 of FIG. 6. While described in terms of the first body 234, it will be appreciated that the aspects described herein can be applied to any body of the plurality of bodies of the tip cap 216. The tip cap 216 can extend between a forward face 260 and an aft face 262. The set of interior ribs 230 can extend across an entirety of the tip cap 216 between the forward face 260 and the aft face 262. Alternatively, at least one rib of the set of interior ribs 230 can extend less than an entirety between the forward face 260 and the aft face 262. As a non-limiting example, the additional interior rib 232 can extend less than an entirety of a distance between the forward face 260 and the aft face 262.

The set of interior ribs 230 can include any suitable number of one or more ribs provided along any suitable portion of the tip cap 216 confronting the body 202 (FIG. 6). At least a portion of the set of interior ribs 230 can be segmented between the forward face 260 and aft face 262. As a non-limiting example, the illustrated interior rib 230 can be split into two interior ribs such that the tip cap 216 includes two interior ribs spaced in the chordwise direction (C) along the tip cap 216.

Figure 8:
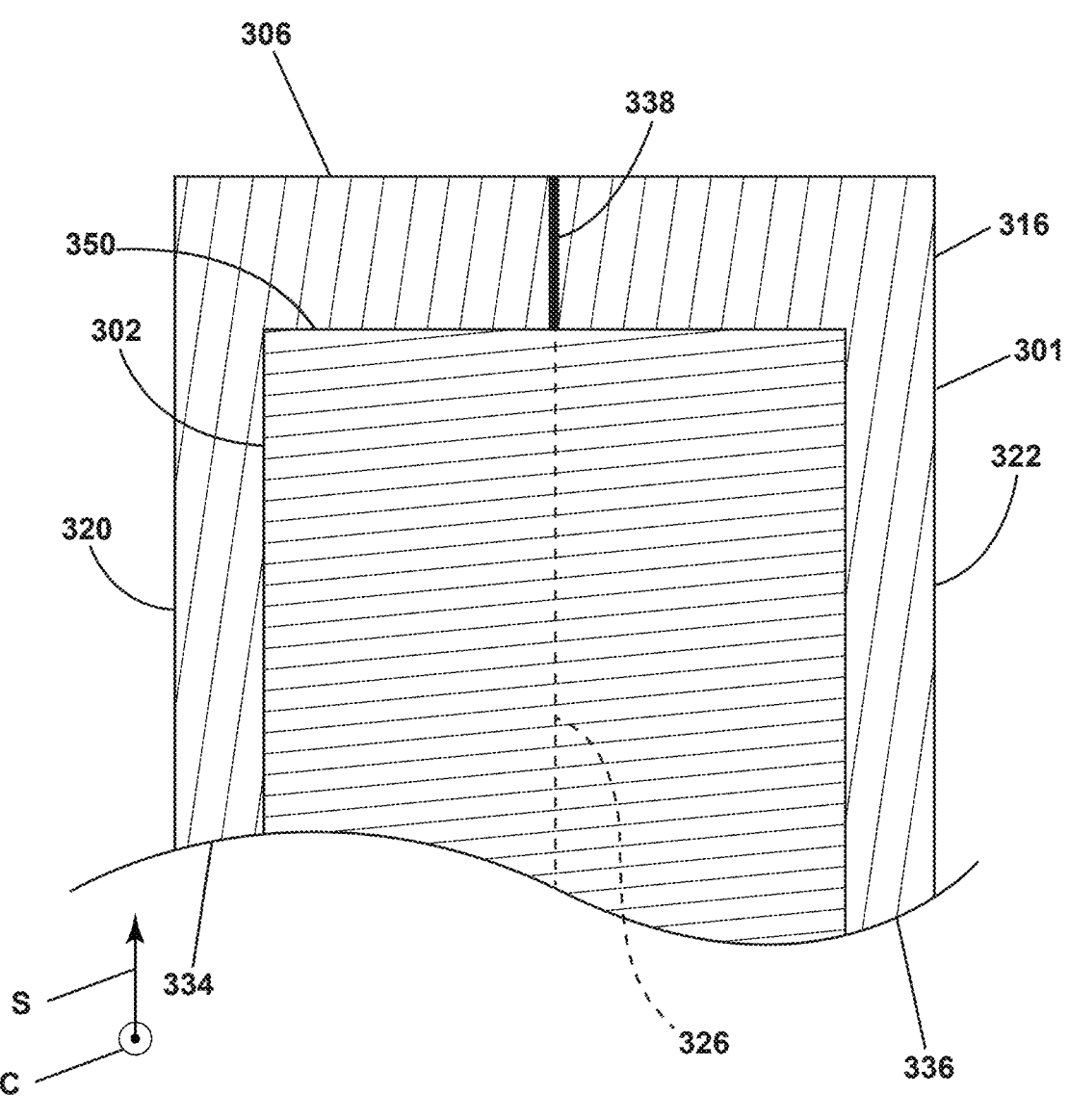
FIG. 8 is a schematic cross-sectional view of an exemplary airfoil assembly suitable for use as the airfoil assembly of FIG. 2, further illustrating the tip cap including a butt joint formed along the tip.

FIG. 8 is a schematic cross-sectional view of an exemplary airfoil assembly 300 suitable for use as the airfoil assembly 100 of FIG. 3. The airfoil assembly 300 is similar to the airfoil assemblies 100, 200; therefore, like parts will be identified with like numerals increased to the 300 series, with it being understood that the description of each airfoil assembly 100, 200 applies to the airfoil assembly 300 unless noted otherwise.

The airfoil assembly 300 includes an outer wall 301 terminating at a tip 306. The outer wall 301 defines a suction side 320, a pressure side 322, and a camber line 326. The outer wall 301 extends in a spanwise direction (S) and a chordwise direction (C). The airfoil assembly 300 includes a body 302 (e.g., a composite body) and a tip cap 316, with both at least partially defining the outer wall 301. The body 302 terminates at a distal end 350. The tip cap 316 extends axially over, with respect to the camber line 326, a respective portion of the body 302 corresponding to the suction side 320 and the pressure side 322 of the airfoil assembly 300. The tip cap 316 extends radially over, with respect to the camber line 326, a respective portion of the body 302.

The airfoil assembly 300 is similar to the airfoil assemblies 100 (FIG. 2), 200 (FIG. 6) in that the tip cap 316 at least partially overlays a portion of the body 302 corresponding to the tip 306, the suction side 320 and the pressure side 322. The tip cap 316, like the tip cap 216 (FIG. 5) includes a plurality of bodies; a first body 334 and a second body 336.

The first body 334 and the second body 336, however, extend over an entire radial length of the tip 306 rather than forming a gap therebetween (e.g., the gap (G) of FIG. 5).

The first body 334 is coupled to the second body 336 along a joint 338. As a non-limiting example, the joint 338 is a butt joint. The joint 338 can be provided along any suitable portion of the tip cap 316. As a non-limiting example, the joint 338 can be formed along the tip 306. The plurality of bodies can be coupled to one another at the joint 338 through any suitable method such as, but not limited to bonding, welding, adhesion, fastening, or any combination thereof.

The use of the tip cap 316 including the joint 338 rather than a tip cap formed as a unitary body (e.g., the tip cap 116 of FIG. 2), allows for a decreased burden of manufacture. It is contemplated that manufacturing the tip cap as a unitary body can be more difficult that manufacturing the tip cap 316 as two separate bodies and then coupling them together at the joint 338.

Figure 9:
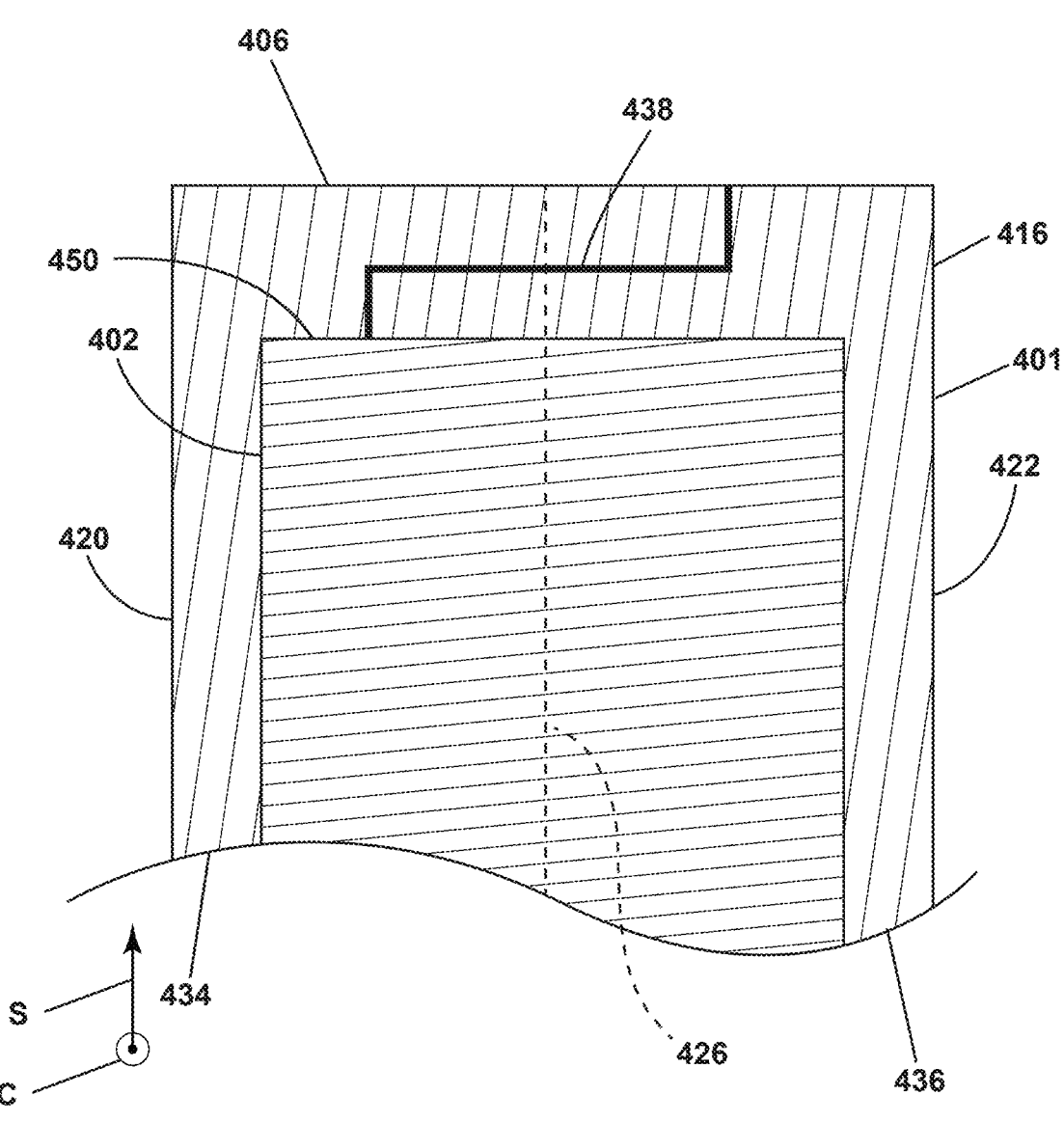
FIG. 9 is a schematic cross-sectional view of an exemplary airfoil assembly suitable for use as the airfoil assembly of FIG. 2, further illustrating the tip cap including a lap joint formed along the tip.

FIG. 9 is a schematic cross-sectional view of an exemplary airfoil assembly 400 suitable for use as the airfoil assembly 100 of FIG. 4. The airfoil assembly 400 is similar to the airfoil assemblies 100, 200, 300; therefore, like parts will be identified with like numerals increased to the 400 series, with it being understood that the description of each airfoil assembly 100, 200, 300 applies to the airfoil assembly 400 unless noted otherwise.

The airfoil assembly 400 includes an outer wall 401 terminating at a tip 406. The outer wall 401 defines a suction side 420, a pressure side 422, and a camber line 426. The outer wall 401 extends in a spanwise direction (S) and a chordwise direction (C). The airfoil assembly 400 includes a body 402 (e.g., a composite body) and a tip cap 416, with both at least partially defining the outer wall 401. The body 402 terminates at a distal end 450. The tip cap 416 extends axially over, with respect to the camber line 426, a respective portion of the body 402 corresponding to the suction side 420 and the pressure side 422 of the airfoil assembly 400. The tip cap 416 extends radially over, with respect to the camber line 426, a respective portion of the body 402.

The airfoil assembly 400 is similar to the airfoil assemblies 100 (FIG. 2), 200 (FIG. 6), 300 (FIG. 8) in that the tip cap 416 at least partially overlays a portion of the body 402 corresponding to the tip 406, the suction side 420 and the pressure side 422. The tip cap 416, like the tip cap 316 (FIG. 8) includes a plurality of bodies, a first body 434 and a second body 436, that are coupled at a joint 438. The joint 438, however, is a lap joint rather than a butt joint like the joint 338 (FIG. 8). It will be appreciated that the joint 438 can be any suitable joint.

Figure 10:
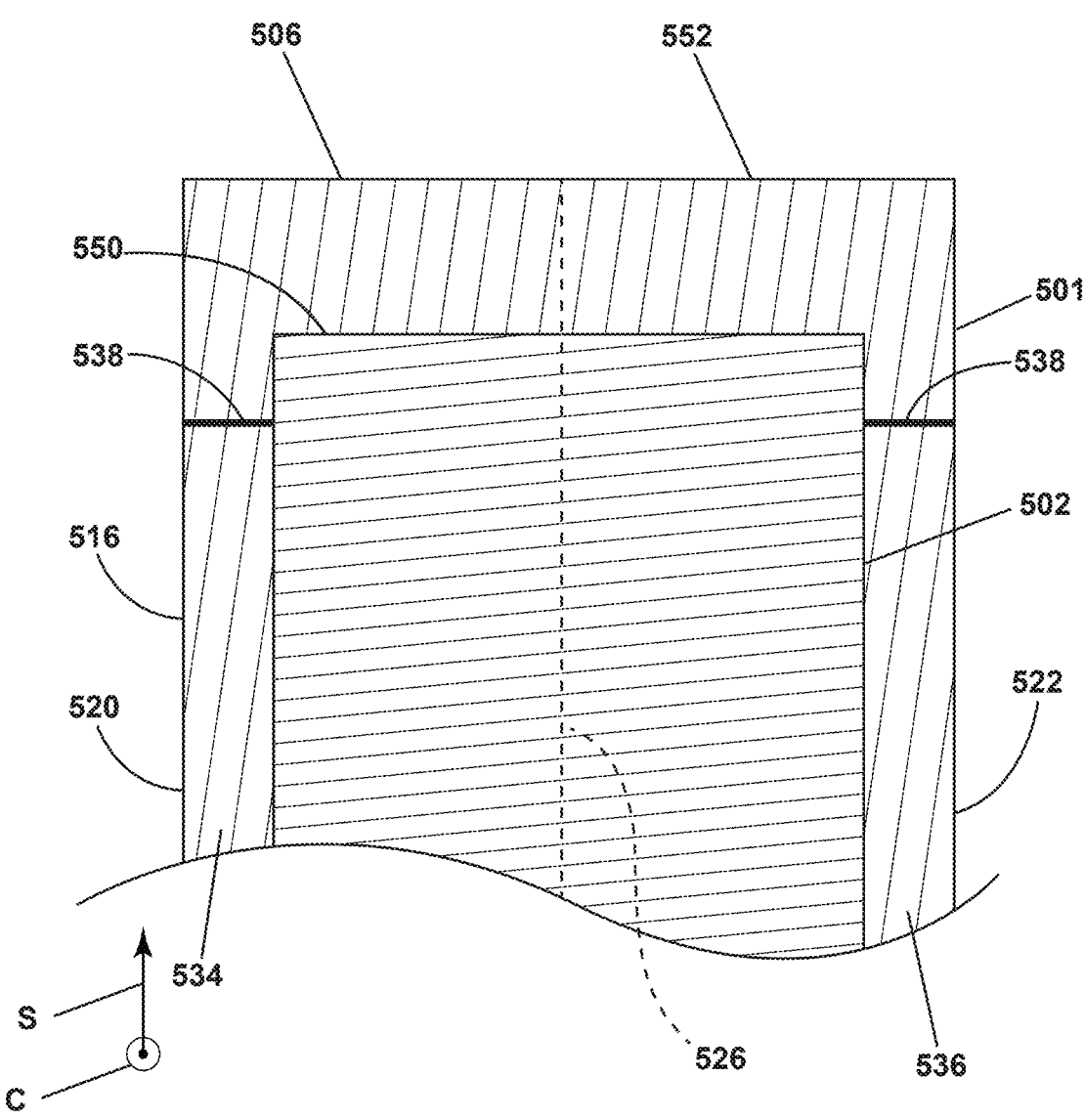
FIG. 10 is a schematic cross-sectional view of an exemplary airfoil assembly suitable for use as the airfoil assembly of FIG. 2, further illustrating the tip cap including a first butt joint and a second butt joint.

FIG. 10 is a schematic cross-sectional view of an exemplary airfoil assembly 500 suitable for use as the airfoil assembly 100 of FIG. 2. The airfoil assembly 500 is similar to the airfoil assemblies 100, 200, 300, 400; therefore, like parts will be identified with like numerals increased to the 500 series, with it being understood that the description of each airfoil assembly 100, 200, 300, 400 applies to the airfoil assembly 500 unless noted otherwise.

The airfoil assembly 500 includes an outer wall 501 terminating at a tip 506. The outer wall 501 defines a suction side 520, a pressure side 522, and a camber line 526. The outer wall 501 extends in a spanwise direction (S) and a chordwise direction (C). The airfoil assembly 500 includes a body 502 (e.g., a composite body) and a tip cap 516, with both at least partially defining the outer wall 501. The body 502 terminates at a distal end 550. The tip cap 516 extends axially over, with respect to the camber line 526, a respective portion of the body 502 corresponding to the suction side 520 and the pressure side 522 of the airfoil assembly 500. The tip cap 516 extends radially over, with respect to the camber line 526, a respective portion of the body 502.

The airfoil assembly 500 is similar to the airfoil assemblies 100 (FIG. 2), 200 (FIG. 6), 300 (FIG. 8), 400 (FIG. 9) in that the tip cap 516 at least partially overlays a portion of the body 502 corresponding to the tip 506, the suction side 520 and the pressure side 522. The tip cap 516, however, includes a plurality of bodies. As a non-limiting example, the tip cap 516 includes a first body 534, a second body 536, and a third body 552. The third body 552 can interconnect the first body 534 and the second body 536. The first body 534, the second body 536, and the third body 552 can each define any suitable portion of the outer wall 501. As a non-limiting example, the first body 534 can extend along a portion of the suction side 520, the second body 536 can extend across a portion of the pressure side 522, the third body 552 can extend across a portion of the tip 506.

The first body 534 can be coupled to the third body 552 at one end of the third body 552, while the second body 536 can be coupled to the third body 552 at a second end of the third body 552. The tip cap 516 can include a plurality of joints 538 coupling the plurality of bodies. The plurality of joints 538 can each be a butt joint. The plurality of joints 538 can each be lap joints. It will be appreciated that the plurality of joints 538 can be any suitable joint such as, but not limited to, a lap joint, a butt joint, or a combination thereof.

Figure 11:
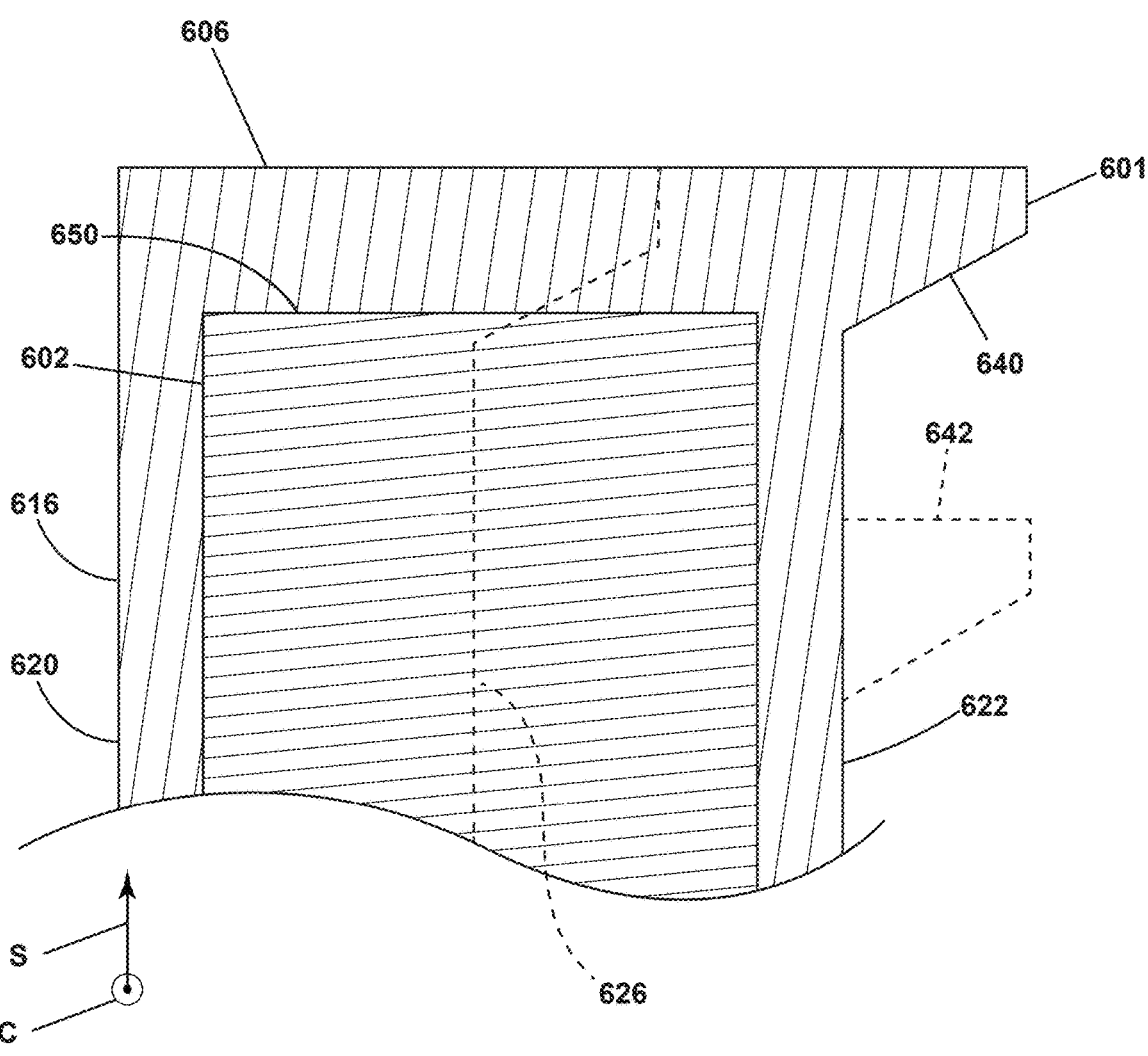
FIG. 11 is a schematic cross-sectional view of an exemplary airfoil assembly suitable for use as the airfoil assembly of FIG. 2, further illustrating an asymmetric tip cap including an external rib.

FIG. 11 is a schematic cross-sectional view of an exemplary airfoil assembly 600 suitable for use as the airfoil assembly 100 of FIG. 2. The airfoil assembly 600 is similar to the airfoil assemblies 100, 200, 300, 400, 500; therefore, like parts will be identified with like numerals increased to the 600 series, with it being understood that the description of each airfoil assembly 100, 200, 300, 400, 500 applies to the airfoil assembly 600 unless noted otherwise.

The airfoil assembly 600 includes an outer wall 601 terminating at a tip 606. The outer wall 601 defines a suction side 620, a pressure side 622, and a camber line 626. The outer wall 601 extends in a spanwise direction (S) and a chordwise direction (C). The airfoil assembly 600 includes a body 602 (e.g., a composite body) and a tip cap 616, with both at least partially defining the outer wall 601. The body 602 terminates at a distal end 650. The tip cap 616 extends axially over, with respect to the camber line 626, a respective portion of the body 602 corresponding to the suction side 620 and the pressure side 622 of the airfoil assembly 600. The tip cap 616 extends radially over, with respect to the camber line 626, a respective portion of the body 602.

The airfoil assembly 600 is similar to the airfoil assemblies 100 (FIG. 2), 200 (FIG. 6), 300 (FIG. 8), 400 (FIG. 9), 500 (FIG. 10) in that the tip cap 616 at least partially overlays a portion of the body 602 corresponding to the tip 606, the suction side 620 and the pressure side 622. The tip cap 616, however, further includes a set of external ribs 640 extending along the outer wall 601. The set of external ribs 640 can be formed on either side of the outer wall 601 such as along either the suction side 620 or the pressure side 622. As a non-limiting example, the set of external ribs 640 can be formed to at last partially define the tip 606. The set of external ribs 640 can include any number of one or more external ribs 640 formed along the outer wall 601 in the spanwise direction (S). For example, the set of external ribs 640 can include an additional external rib 642 spaced from the illustrated external rib 640 in the spanwise direction. The set of external ribs 640 can be symmetric or asymmetric about the camber line 626.

The set of external ribs 640 can have any suitable shape when viewed along a plane extending along the camber line 626 intersecting the root (e.g., the root 104 of FIG. 2) and the tip 606 at a same percentage between the leading edge (e.g., the leading edge 108 of FIG. 2) and the trailing edge (e.g. the trailing edge 108 of FIG. 2). As a non-limiting example, the set of external ribs 640 can include a trapezoidal, rectangular, circular, triangular, or any combination therefor cross-sectional area.

During operation, the set of external ribs 640 can extend into a working airflow path such that a working airflow flows over the set of external ribs 640. It is contemplated that the set of external ribs 640 can extract work from the working airflow or otherwise channel the working airflow in a desired fashion. As such, the set of external ribs 640 can be defined as an aerodynamic rib formed along the tip cap 616.

Figure 12:
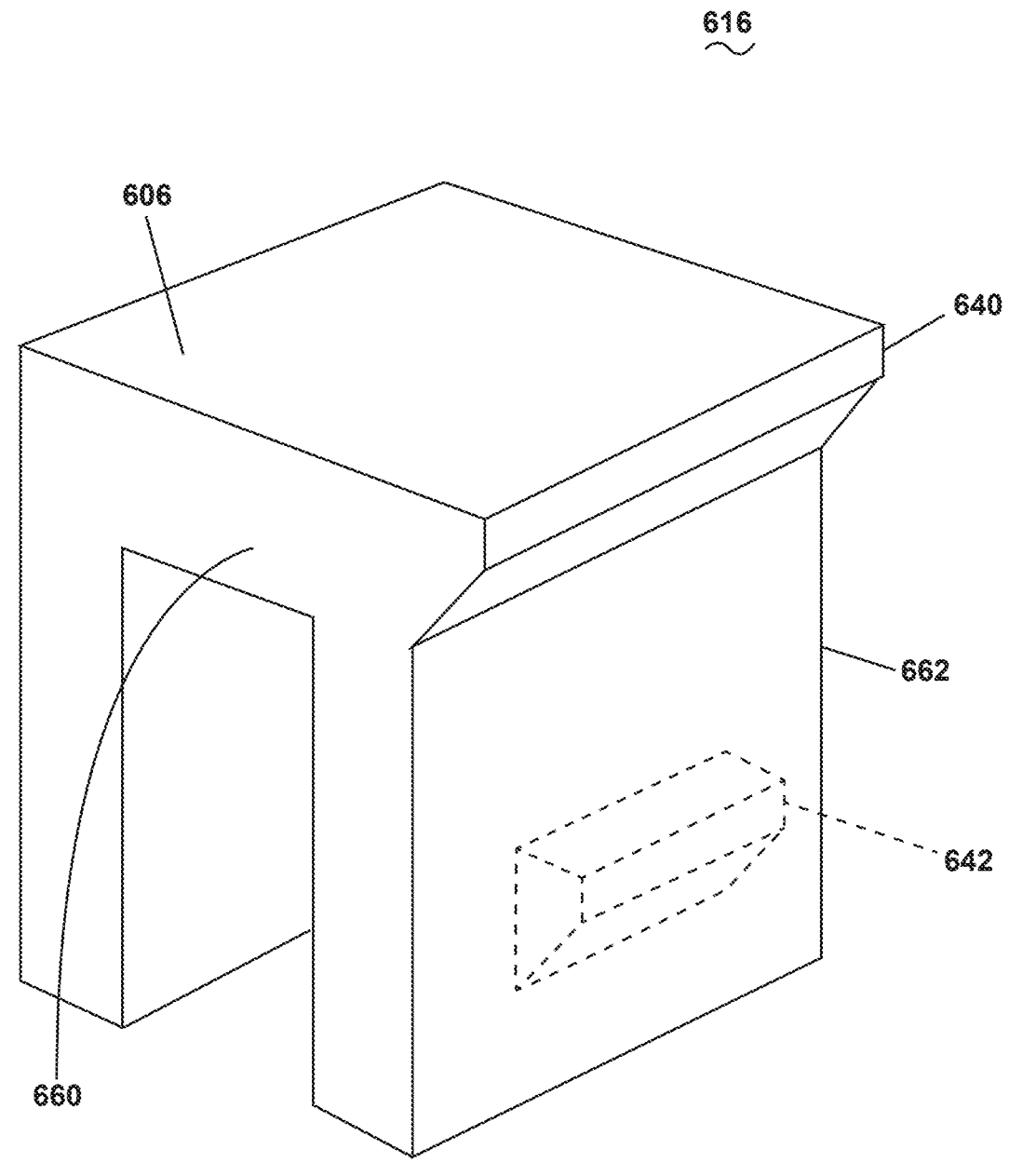
FIG. 12 is a schematic isometric view of the tip cap of FIG. 11, further illustrating the external rib.

FIG. 12 is a schematic isometric view of the tip cap 616 of FIG. 11. The tip cap 616 can extend between a forward face 660 and an aft face 662. The set of external ribs 640 can extend across an entirety of the tip cap 616 between the forward face 660 and the aft face 662. Alternatively, at least one rib of the set of external ribs 640 can extend less than an entirety between the forward face 660 and the aft face 662. As a non-limiting example, the additional external rib 642 can extend less than an entirety of a distance between the forward face 660 and the aft face 662.

The set of external ribs 640 can include any suitable number of one or more ribs provided along any suitable portion of the tip cap 616 provided along the outer wall 601. At least a portion of the set of external ribs 640 can be segmented between the forward face 660 and aft face 662. As a non-limiting example, the illustrated external ribs 640 can be split into two interior ribs such that the tip cap 616 includes two interior ribs spaced in the chordwise direction (C) along the tip cap 616.

Figure 13:
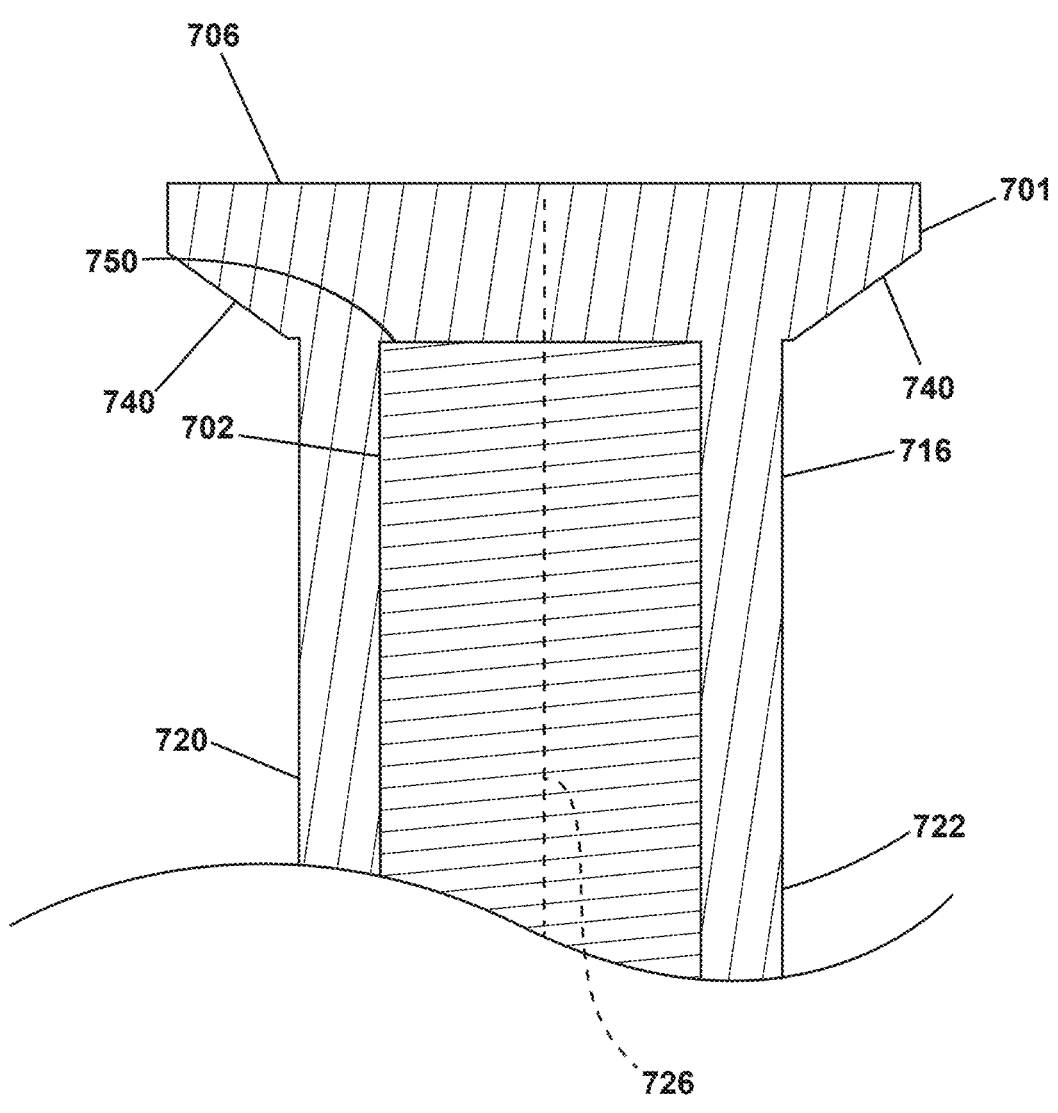
FIG. 13 is a schematic cross-sectional view of an exemplary airfoil assembly suitable for use as the airfoil assembly of FIG. 2, further illustrating a tip cap including at least two external ribs.

FIG. 13 is a schematic cross-sectional view of an exemplary airfoil assembly 700 suitable for use as the airfoil assembly 100 of FIG. 2. The airfoil assembly 700 is similar to the airfoil assemblies 100, 200, 300, 400, 500, 600; therefore, like parts will be identified with like numerals increased to the 700 series, with it being understood that the description of each airfoil assembly 100, 200, 300, 400, 500, 600, applies to the airfoil assembly 700 unless noted otherwise.

The airfoil assembly 700 includes an outer wall 701 terminating at a tip 706. The outer wall 701 defines a suction side 720, a pressure side 722, and a camber line 726. The outer wall 701 extends in a spanwise direction (S) and a chordwise direction (C). The airfoil assembly 700 includes a body 702 (e.g., a composite body) and a tip cap 716, with both at least partially defining the outer wall 701. The body 702 terminates at a distal end 750. The tip cap 716 extends axially over, with respect to the camber line 726, a respective portion of the body 702 corresponding to the suction side 720 and the pressure side 722 of the airfoil assembly 700. The tip cap 716 extends radially over, with respect to the camber line 726, a respective portion of the body 702.

The airfoil assembly 700 is similar to the airfoil assemblies 100 (FIG. 2), 200 (FIG. 6), 300 (FIG. 8), 400 (FIG. 9), 500 (FIG. 10), 600 (FIG. 11) in that the tip cap 716 at least partially overlays a portion of the body 702 corresponding to the tip 706, the suction side 720 and the pressure side 722. The tip cap 716, like the tip cap 616 (FIG. 9), includes a set of external ribs 740. The difference, however, is that the set of external ribs 740 includes radially opposing external ribs 740 such that the set of external ribs 740 are formed on both the suction side 720 and the pressure side 722. The set of external ribs 740, as illustrated, are symmetric about the camber line 726 but it will be appreciated that the set of external ribs 740 can be asymmetric about the camber line 726.

Figure 14:
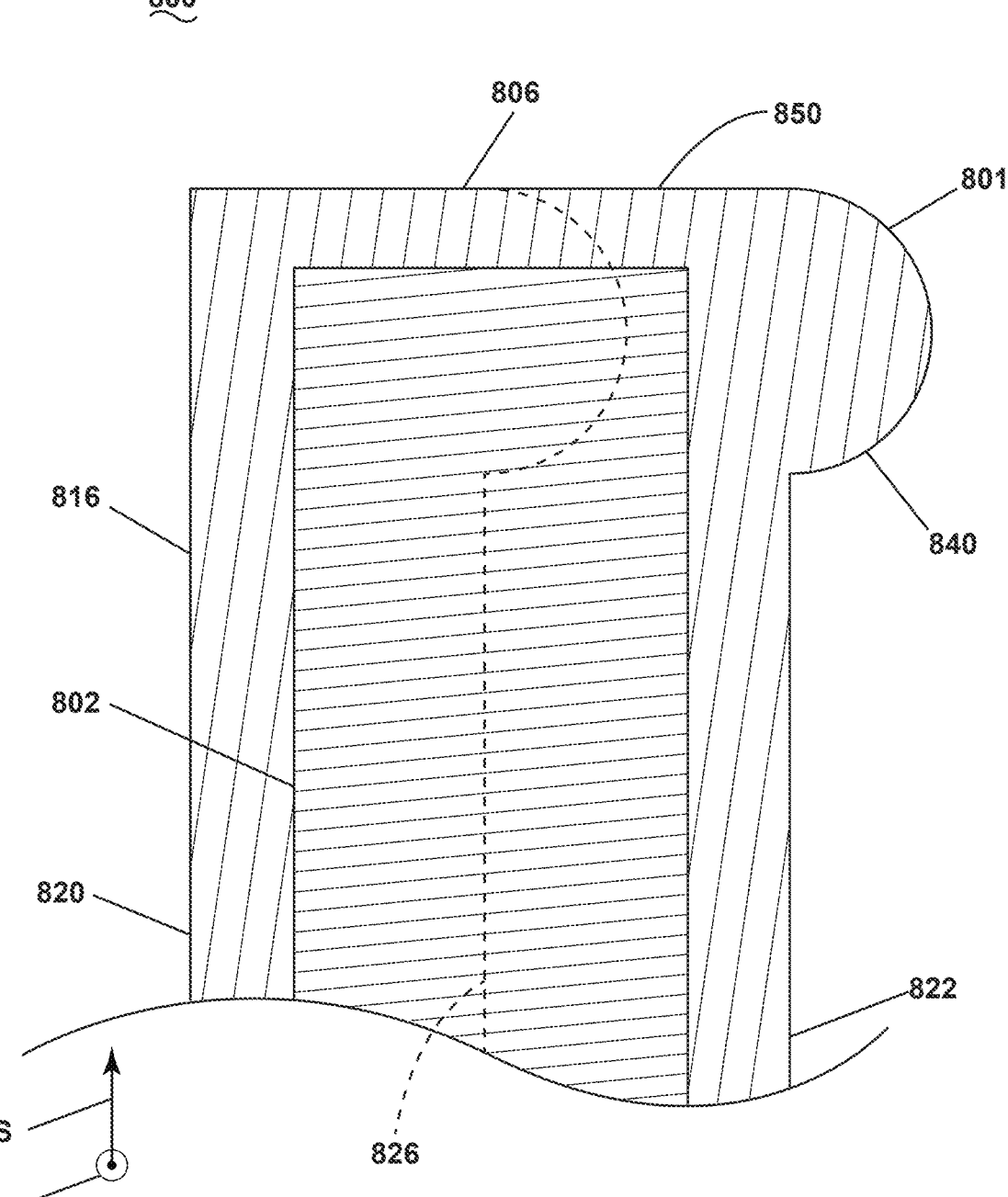
FIG. 14 is a schematic cross-sectional view of an exemplary airfoil assembly suitable for use as the airfoil assembly of FIG. 2, further illustrating an asymmetric tip cap including a semi-circular external rib.

FIG. 14 is a schematic cross-sectional view of an exemplary airfoil assembly 800 suitable for use as the airfoil assembly 100 of FIG. 2. The airfoil assembly 800 is similar to the airfoil assemblies 100, 200, 300, 400, 500, 600, 700; therefore, like parts will be identified with like numerals increased to the 800 series, with it being understood that the description of each airfoil assembly 100, 200, 300, 400, 500, 600, 700, applies to the airfoil assembly 800 unless noted otherwise.

The airfoil assembly 800 includes an outer wall 801 terminating at a tip 806. The outer wall 801 defines a suction side 820, a pressure side 822, and a camber line 826. The outer wall 801 extends in a spanwise direction (S) and a chordwise direction (C). The airfoil assembly 800 includes a body 802 (e.g., a composite body) and a tip cap 816, with both at least partially defining the outer wall 801. The body 802 terminates at a distal end 850. The tip cap 816 extends axially over, with respect to the camber line 826, a respective portion of the body 802 corresponding to the suction side 820 and the pressure side 822 of the airfoil assembly 800. The tip cap 816 extends radially over, with respect to the camber line 826, a respective portion of the body 802.

The airfoil assembly 800 is similar to the airfoil assemblies 100 (FIG. 2), 200 (FIG. 6), 300 (FIG. 8), 400 (FIG. 9), 500 (FIG. 10), 600 (FIG. 11), 700 (FIG. 13) in that the tip cap 816 at least partially overlays a portion of the body 802 corresponding to the tip 806, the suction side 820 and the pressure side 822. The tip cap 816, like the tip cap 616 (FIG. 9), 716 (FIG. 10) includes a set of external ribs 840. The difference, however, is that the set of external ribs 840 include a semi-circular cross-sectional area when viewed along a plane extending along the camber line 826 intersecting the root (e.g., the root 104 of FIG. 2) and the tip 806 at a same percentage between the leading edge (e.g., the leading edge 108 of FIG. 2) and the trailing edge (e.g. the trailing edge 108 of FIG. 2). The tip cap 816, as illustrated, is asymmetric about the camber line 826, however, it will be appreciated that the tip cap 816 can be symmetric about the camber line 826.

Figure 15:
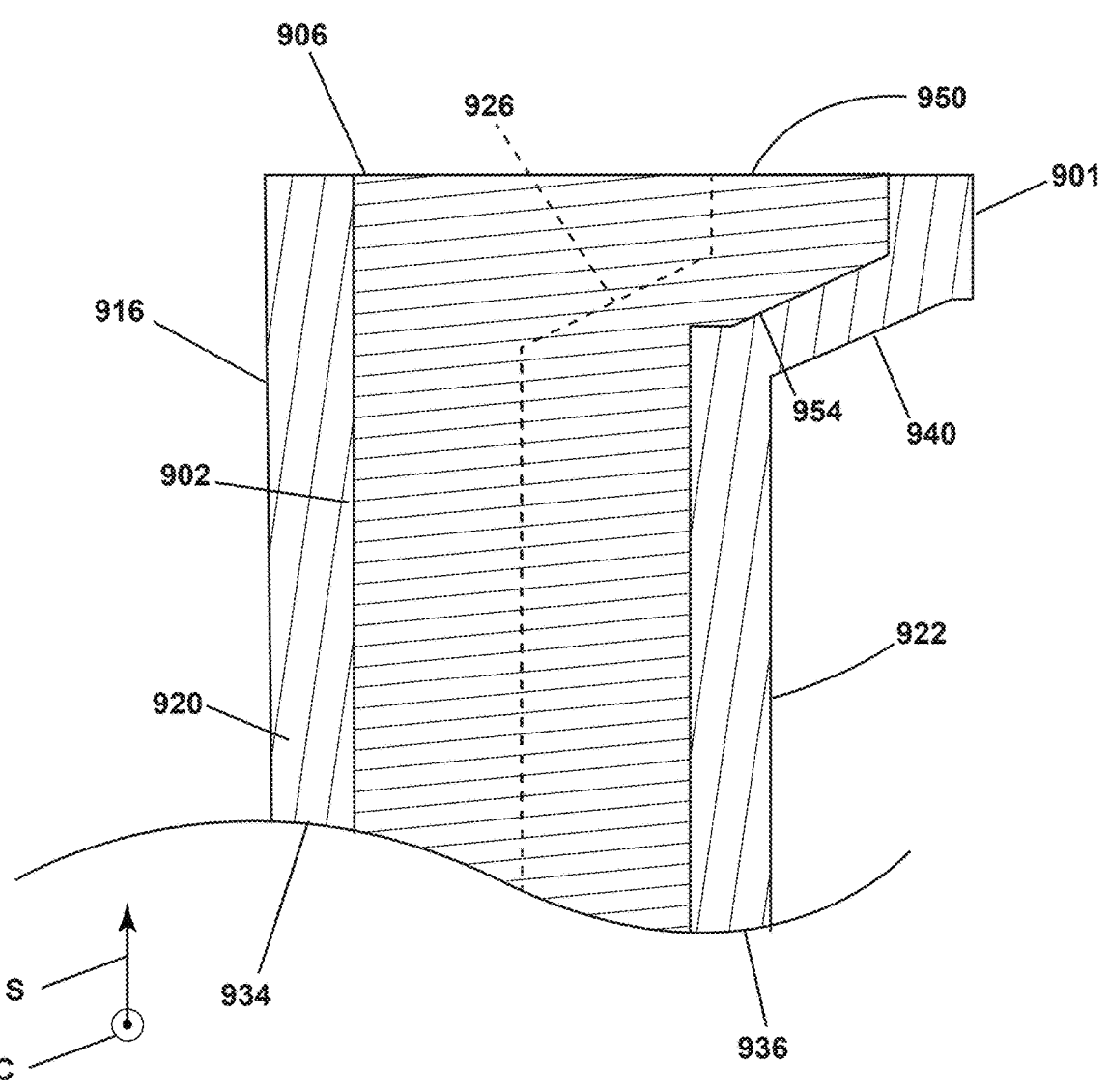
FIG. 15 is a schematic cross-sectional view of an exemplary airfoil assembly suitable for use as the airfoil assembly of FIG. 2, further illustrating an asymmetric tip cap including an external rib.

FIG. 15 is a schematic cross-sectional view of an exemplary airfoil assembly 900 suitable for use as the airfoil assembly 100 of FIG. 2. The airfoil assembly 900 is similar to the airfoil assemblies 100, 200, 300, 400, 500, 600, 700, 800; therefore, like parts will be identified with like numerals increased to the 900 series, with it being understood that the description of each airfoil assembly 100, 200, 300, 400, 500, 600, 700, 800, applies to the airfoil assembly 900 unless noted otherwise.

The airfoil assembly 900 includes an outer wall 901 terminating at a tip 906. The outer wall 901 defines a suction side 920, a pressure side 922, and a camber line 926. The outer wall 901 extends in a spanwise direction (S) and a chordwise direction (C). The airfoil assembly 900 includes a body 902 (e.g., a composite body) and a tip cap 916, with both at least partially defining the outer wall 901. The body 902 terminates at a distal end 950. The tip cap 916 extends axially over, with respect to the camber line 926, a respective portion of the body 902 corresponding to the suction side 920 and the pressure side 922 of the airfoil assembly 900.

The airfoil assembly 900 is similar to the airfoil assemblies 100 (FIG. 2), 200 (FIG. 6), 300 (FIG. 8), 400 (FIG. 9), 500 (FIG. 10), 600 (FIG. 11), 700 (FIG. 13), 800 (FIG. 14) in that the tip cap 916 at least partially overlays a portion of the body 902 corresponding to the suction side 920 and the pressure side 922. The tip cap 916, like the tip cap 216 (FIG. 5), includes a plurality of bodies; a first body 934 and a second body 936. The tip cap 916, however, does not extend along the distal end 950. Instead, the body 902 extends to and defines a respective portion of the tip 906.

The body 902 can include a flared section 954. The tip cap 916 can follow the contour of the body 902. As such, the tip cap 916 can flare outwardly with the body 902. A set of external ribs 940 can be formed by the flaring of the tip cap 916. As such, it will be appreciated that the body 902 and the tip cap 916 can, together, form the set of external ribs 940. The tip cap 916, the body 902, and the set of external ribs 940 can be symmetric or asymmetric about the camber line 926.

Figure 16:
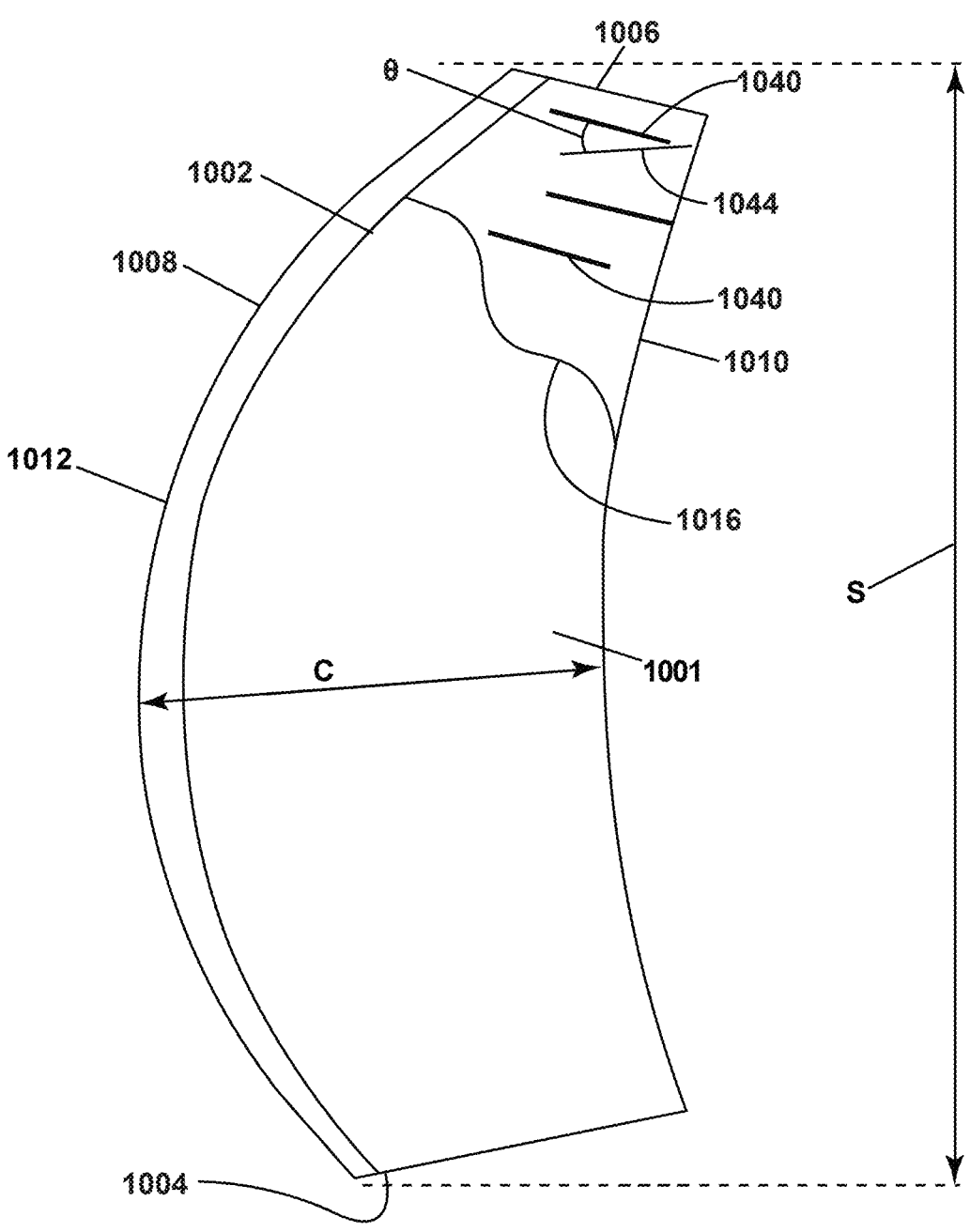
FIG. 16 is a schematic cross-sectional view of an exemplary airfoil assembly suitable for use as the airfoil assembly of FIG. 2, further illustrating a set of external ribs provided along the tip cap.

FIG. 16 is a schematic cross-sectional view of an exemplary airfoil assembly 1000 suitable for use as the airfoil assembly 100 of FIG. 2. The airfoil assembly 1000 is similar to the airfoil assemblies 100, 200, 300, 400, 500, 600, 700, 800, 900; therefore, like parts will be identified with like numerals increased to the 1000 series, with it being understood that the description of each airfoil assembly 100, 200, 300, 400, 500, 600, 700, 800, 900, applies to the airfoil assembly 1000 unless noted otherwise.

The airfoil assembly 1000 can include an outer wall 1001 extending between a leading edge 1008 and a trailing edge 1010 in a chordwise direction (C), and between a root 1004 and a tip 1006 in a spanwise direction (S). A tip cap 1016 and a body 1002 (e.g., a composite body) can each form a respective portion of the outer wall 1001. A cladding 1012 can optionally be provided along a portion of the leading edge 1008.

The airfoil assembly 1000 is similar to the airfoil assemblies 100 (FIG. 2), 200 (FIG. 6), 300 (FIG. 8), 400 (FIG. 9), 500 (FIG. 10), 600 (FIG. 11), 700 (FIG. 13), 800 (FIG. 14), 900 (FIG. 15) in that the tip cap 1016 at least partially overlays a portion of the body 1002. The tip cap 1016 is similar to the tip caps 616 (FIG. 9), 716 (FIG. 10), 816 (FIG. 11), 916 (FIG. 12) in that the tip cap 1016 includes a set of external ribs 1040. The set of external ribs 1040 can be spaced with respect to one another in the spanwise direction (S) or the chordwise direction (C).

Each rib of the set of external ribs 1040 can extend a respective length in the chordwise direction (C) that is greater than or equal to 10% and less than or equal to 100% of a length of the outer wall 1001 in the chordwise direction (C) between the leading edge 1008 and the trailing edge 1010 where the respective external rib is provided. In other words, each rib of the set of external ribs 1040 can extend greater than or equal to 10% and less than or equal to 100% of the chordwise length of the outer wall 1001 in the chordwise direction (C). Each rib of the set of external ribs 1040 can extend the same distance or differing distances between the leading edge 1008 and the trialing edge 1010 with respect to one another.

Each rib of the set of external ribs 1040 can extend along a line (e.g. along the illustrated linear line, as illustrated). The line, and hence the rib, can be positioned at an angle (θ) with respect to a straight line 1044 extending in the chordwise direction (C). The straight line 1044 can intersect the leading edge 1008 and the trailing edge 1010 at a same percentage between the root 1004 and the tip 1006. The angle (θ) can be any suitable angle. As a non-limiting example, the angle (θ) can have an absolute value of greater than or equal to 0 degrees and less than or equal to 180 degrees. As a non-limiting example, the angle (θ) can be +/−30 degrees from the straight line 1044. As a non-limiting example, the angle (θ) can be non-zero.

The set of external ribs 1040 can include any number of one or more external ribs. The set of external ribs 1040 can be provided along any suitable portion of the tip cap 1016. As a non-limiting example, the set of external ribs 1040 can be provided between the leading edge 1008 and the trailing edge 1010 in the chordwise direction (C) or correspond to at least a portion of at least one of the leading edge 1008 or the trailing edge 1010. While illustrated as linearly extending, it will be appreciated that the set of external ribs 1040 can be swept in the chordwise direction (C) or otherwise extend non-linearly.

It is contemplated that the set of external ribs 1040 can be used for aerodynamic or acoustic purposes of the airfoil assembly 100. As a non-limiting example, the angle (θ) can be selected in order to tune the aerodynamic or acoustic properties associated with the inclusion of the set of external ribs 1040. As a non-limiting example, at least one of the set of external ribs 1040 can be angled or otherwise placed such that the exterior rib extracts work from the working airflow flowing around the airfoil assembly 100. In other words, the external rib can be used for aerodynamic purposes to increase the aerodynamic efficiency or otherwise to increase the work extracted from the working airfoil by the airfoil assembly 100. As a non-limiting example, at least one external rib of the set of external ribs 1040 can reduce a vibration of the airfoil assembly 100 attributed to the working airflow flowing around the airfoil assembly 1000. In other words, the at least one external rib can be included to decrease the acoustics associated with use of the airfoil assembly 100.

Benefits associated with the present disclosure include a composite airfoil assembly with an increased resiliency when compared to a conventional composite airfoil assembly. For example, the conventional composite airfoil assembly can include a composite body with a metallic sheath provided over an exterior of the composite body. The metallic sheath is bonded to or coupled directly to the composite body and does not extend over a portion of the composite body corresponding to the tip. The conventional composite airfoil assembly can require the metallic sheath to shield the composite body from external forces during operation of the conventional composite airfoil assembly. The composite airfoil assembly, as described herein, however, includes the tip cap in place of the conventional metallic sheath. The tip cap extends over a portion of the tip corresponding to the body and therefore adds additional stiffness and resiliency to the composite airfoil assembly when compared to the conventional composite airfoil assembly.

Further, the composite airfoil assembly as described herein can reduce the deflection (e.g., movement) of the tip when an external force is applied to the composite airfoil assembly when compared to the conventional composite airfoil assembly. For example, while the conventional composite airfoil assembly can help with shielding against external forces, it has been found that some forces can still cause the tip to deflect undesirably, ultimately resulting in a shortened lifespan of the conventional composite airfoil assembly. The composite airfoil assembly as described herein, however, includes the tip cap which extends over a portion of the tip corresponding to the body. This extra extension of the tip cap has been found to greatly reduce the amount of that the tip can deflect under certain circumstances, when compared to the conventional composite airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a fan section, a compressor section, a combustion section, and a turbine section in serial flow arrangement, and a composite airfoil assembly comprising an outer wall extending between a leading edge and a trailing edge in a chordwise direction and between a root and a tip in a spanwise direction, the outer wall defining a pressure side and a suction side, and defining a camber line extending equidistant between the pressure side and the suction side, a composite body at least partially defining the outer wall and terminating at a distal end, and a tip cap defining at least a portion of the outer wall and extending axially over at least a portion of the composite body corresponding to the pressure side and the suction side, and radially over at least a portion of the composite body.

A composite airfoil assembly comprising an outer wall extending between a leading edge and a trailing edge in a chordwise direction and between a root and a tip in a spanwise direction, the outer wall defining a pressure side, a suction side, and a camber line extending through the composite airfoil assembly and being equidistant between the pressure side and the suction side, a composite body at least partially defining the outer wall and terminating at a distal end, and a metallic tip cap defining at least a portion of the outer wall and extending axially over at least a portion of the composite body corresponding to the pressure side and the suction side, and radially over at least a portion of the composite body.

A turbine engine comprising a fan section, a compressor section, a combustion section, and a turbine section in serial flow arrangement, and an airfoil assembly comprising an outer wall extending between a leading edge and a trailing edge in a chordwise direction and between a root and a tip in a spanwise direction, the outer wall defining a pressure side and a suction side, and defining a camber line extending equidistant between the pressure side and the suction side, a body at least partially defining the outer wall and terminating at a distal end, and a tip cap defining at least a portion of the outer wall and extending axially over at least a portion of the composite body corresponding to the pressure side and the suction side, and radially over at least a portion of the composite body.

An airfoil assembly comprising an outer wall extending between a leading edge and a trailing edge in a chordwise direction and between a root and a tip in a spanwise direction, the outer wall defining a pressure side, a suction side, and a camber line extending through the airfoil assembly and being equidistant between the pressure side and the suction side, a body at least partially defining the outer wall and terminating at a distal end, and a tip cap defining at least a portion of the outer wall and extending axially over at least a portion of the composite body corresponding to the pressure side and the suction side, and radially over at least a portion of the composite body.

The turbine engine of any preceding clause, wherein the tip cap is formed as a unitary body extending continuously along the tip between the suction side and the pressure side.

The turbine engine of any preceding clause, wherein the tip cap includes a plurality of bodies, with adjacent bodies of the plurality of bodies being coupled to one another along at least one joint.

The turbine engine of any preceding clause, wherein the at least one joint is a butt joint or a lap joint.

The turbine engine of any preceding clause, wherein the at least one joint is formed along a portion of the tip cap corresponding to the tip.

The turbine engine of any preceding clause, wherein the at least one joint is formed along a portion of the tip cap corresponding to at least one of the suction side or the pressure side.

The turbine engine of any preceding clause, wherein the at least one joint includes a first joint provided on the pressure side and a second joint provided on the suction side, and the plurality of bodies includes a first body, a second body, and a third body interconnecting the first body and the second body.

The turbine engine of any preceding clause, wherein the tip cap is symmetric or asymmetric about the camber line.

The turbine engine of any preceding clause, wherein the tip cap includes a hollow interior.

The turbine engine of any preceding clause, wherein the tip cap includes at least one interior rib extending inwardly into the composite body.

The turbine engine of any preceding clause, wherein the at least one interior rib is formed at the tip.

The turbine engine of any preceding clause, wherein the tip cap includes at least one external rib provided along the outer wall.

The turbine engine of any preceding clause, wherein the at least one external rib extends along the tip cap in the chordwise direction and defines a line that the at least one external rib extends along.

The turbine engine of any preceding clause, wherein the line forms a non-zero angle with respect to a straight line extending in the chordwise direction.

The turbine engine of any preceding clause, wherein the at least one external rib includes a plurality of external ribs spaced in the spanwise direction.

The turbine engine of any preceding clause, wherein the at least one external rib includes a trapezoidal or semi-circular cross section when viewed along a plane extending along the camber line between the root and the tip and being equidistant between the leading edge and the trailing edge.

The turbine engine of any preceding clause, wherein the at least one external rib is symmetric or asymmetric about the camber line.

The turbine engine of any preceding clause, wherein the tip cap and the composite body together define at least one external rib provided along the outer wall.

The turbine engine of any preceding clause, wherein at least a portion of the distal end is provided along the tip.

The turbine engine of any preceding clause, wherein the body includes a composite material, and the tip cap includes a metallic material.

The turbine engine of any preceding clause, wherein the body has a first width extending between opposing sides of the outer wall of the body along the distal end, and the tip cap has a second width extending between the suction side and the pressure side at the tip.

The turbine engine of any preceding clause, wherein the first width is less than the second width.

The turbine engine of any preceding clause, wherein the tip cap extends across an entirety of the first width.

The turbine engine of any preceding clause, wherein the tip cap extends across an entirety of the second width.

The turbine engine of any preceding clause, wherein the tip cap extends outward from the distal end in the spanwise direction to define an increased thickness having a height in the spanwise direction.

The turbine engine of any preceding clause, wherein the airfoil assembly extends a maximum length in the spanwise direction between the root and the tip and the height of the tip cap is greater than 0% and less than or equal to 15% of the maximum length.

The turbine engine of any preceding clause, wherein the airfoil assembly extends a maximum length in the spanwise direction between the root and the tip and the height of the tip cap is greater than or equal to 4% and less than or equal to 15% of the maximum length.

The composite airfoil assembly of any preceding clause, wherein the tip cap is formed as a unitary body extending continuously along the tip between the suction side and the pressure side.

The composite airfoil assembly of any preceding clause, wherein the tip cap includes a plurality of bodies, with adjacent bodies of the plurality of bodies being coupled to one another along at least one joint.

The composite airfoil assembly of any preceding clause, wherein the at least one joint is a butt joint or a lap joint.

The composite airfoil assembly of any preceding clause, wherein the at least one joint is formed along a portion of the tip cap corresponding to the tip.

The composite airfoil assembly of any preceding clause, wherein the at least one joint is formed along a portion of the tip cap corresponding to at least one of the suction side or the pressure side.

The composite airfoil assembly of any preceding clause, wherein the at least one joint includes a first joint provided on the pressure side and a second joint provided on the suction side, and the plurality of bodies includes a first body, a second body, and a third body interconnecting the first body and the second body.

The composite airfoil assembly of any preceding clause, wherein the tip cap is symmetric or asymmetric about the camber line.

The composite airfoil assembly of any preceding clause, wherein the tip cap includes a hollow interior.

The composite airfoil assembly of any preceding clause, wherein the tip cap includes at least one interior rib extending inwardly into the composite body.

The composite airfoil assembly of any preceding clause, wherein the at least one interior rib is formed at the tip.

The composite airfoil assembly of any preceding clause, wherein the tip cap includes at least one external rib provided along the outer wall.

The composite airfoil assembly of any preceding clause, wherein the at least one external rib extends along the tip cap in the chordwise direction and defines a line that the at least one external rib extends along.

The composite airfoil assembly of any preceding clause, wherein the line forms a non-zero angle with respect to a straight line extending in the chordwise direction.

The composite airfoil assembly of any preceding clause, wherein the at least one external rib includes a plurality of external ribs spaced in the spanwise direction.

The composite airfoil assembly of any preceding clause, wherein the at least one external rib includes a trapezoidal or semi-circular cross section when viewed along a plane extending along the camber line between the root and the tip and being equidistant between the leading edge and the trailing edge.

The composite airfoil assembly of any preceding clause, wherein the at least one external rib is symmetric or asymmetric about the camber line.

The composite airfoil assembly of any preceding clause, wherein the tip cap and the composite body together define at least one external rib provided along the outer wall.

The composite airfoil assembly of any preceding clause, wherein at least a portion of the distal end is provided along the tip.

The composite airfoil assembly of any preceding clause, wherein the body includes a composite material, and the tip cap includes a metallic material.

The composite airfoil assembly of any preceding clause, wherein the body has a first width extending between opposing sides of the outer wall of the body along the distal end, and the tip cap has a second width extending between the suction side and the pressure side at the tip.

The composite airfoil assembly of any preceding clause, wherein the first width is less than the second width.

The composite airfoil assembly of any preceding clause, wherein the tip cap extends across an entirety of the first width.

The composite airfoil assembly of any preceding clause, wherein the tip cap extends across an entirety of the second width.

The composite airfoil assembly of any preceding clause, wherein the tip cap extends outward from the distal end in the spanwise direction to define an increased thickness having a height in the spanwise direction.

The composite airfoil assembly of any preceding clause, wherein the airfoil assembly extends a maximum length in the spanwise direction between the root and the tip and the height of the tip cap is greater than 0% and less than or equal to 15% of the maximum length.

The composite airfoil assembly of any preceding clause, wherein the airfoil assembly extends a maximum length in the spanwise direction between the root and the tip and the height of the tip cap is greater than or equal to 4% and less than or equal to 15% of the maximum length.

The airfoil assembly of any preceding clause, wherein the tip cap is formed as a unitary body extending continuously along the tip between the suction side and the pressure side.

The airfoil assembly of any preceding clause, wherein the tip cap includes a plurality of bodies, with adjacent bodies of the plurality of bodies being coupled to one another along at least one joint.

The airfoil assembly of any preceding clause, wherein the at least one joint is a butt joint or a lap joint.

The airfoil assembly of any preceding clause, wherein the at least one joint is formed along a portion of the tip cap corresponding to the tip.

The airfoil assembly of any preceding clause, wherein the at least one joint is formed along a portion of the tip cap corresponding to at least one of the suction side or the pressure side.

The airfoil assembly of any preceding clause, wherein the at least one joint includes a first joint provided on the pressure side and a second joint provided on the suction side, and the plurality of bodies includes a first body, a second body, and a third body interconnecting the first body and the second body.

The airfoil assembly of any preceding clause, wherein the tip cap is symmetric or asymmetric about the camber line.

The airfoil assembly of any preceding clause, wherein the tip cap includes a hollow interior.

The airfoil assembly of any preceding clause, wherein the tip cap includes at least one interior rib extending inwardly into the composite body.

The airfoil assembly of any preceding clause, wherein the at least one interior rib is formed at the tip.

The airfoil assembly of any preceding clause, wherein the tip cap includes at least one external rib provided along the outer wall.

The airfoil assembly of any preceding clause, wherein the at least one external rib extends along the tip cap in the chordwise direction and defines a line that the at least one external rib extends along.

The airfoil assembly of any preceding clause, wherein the line forms a non-zero angle with respect to a straight line extending in the chordwise direction.

The airfoil assembly of any preceding clause, wherein the at least one external rib includes a plurality of external ribs spaced in the spanwise direction.

The airfoil assembly of any preceding clause, wherein the at least one external rib includes a trapezoidal or semi-circular cross section when viewed along a plane extending along the camber line between the root and the tip and being equidistant between the leading edge and the trailing edge.

The airfoil assembly of any preceding clause, wherein the at least one external rib is symmetric or asymmetric about the camber line.

The airfoil assembly of any preceding clause, wherein the tip cap and the composite body together define at least one external rib provided along the outer wall.

The airfoil assembly of any preceding clause, wherein at least a portion of the distal end is provided along the tip.

The airfoil assembly of any preceding clause, wherein the body includes a composite material, and the tip cap includes a metallic material.

The airfoil assembly of any preceding clause, wherein the body has a first width extending between opposing sides of the outer wall of the body along the distal end, and the tip cap has a second width extending between the suction side and the pressure side at the tip.

The airfoil assembly of any preceding clause, wherein the first width is less than the second width.

The airfoil assembly of any preceding clause, wherein the tip cap extends across an entirety of the first width.

The airfoil assembly of any preceding clause, wherein the tip cap extends across an entirety of the second width.

The airfoil assembly of any preceding clause, wherein the tip cap extends outward from the distal end in the spanwise direction to define an increased thickness having a height in the spanwise direction.

The airfoil assembly of any preceding clause, wherein the airfoil assembly extends a maximum length in the spanwise direction between the root and the tip and the height of the tip cap is greater than 0% and less than or equal to 15% of the maximum length.

The airfoil assembly of any preceding clause, wherein the airfoil assembly extends a maximum length in the spanwise direction between the root and the tip and the height of the tip cap is greater than or equal to 4% and less than or equal to 15% of the maximum length.

The turbine engine of any preceding clause, wherein the turbine engine is an unducted turbine engine.

The unducted turbine engine of any preceding clauses, further comprising a nacelle and the fan section includes a fan blade extending outwardly from the nacelle.

The unducted turbine engine of any preceding clauses, wherein the composite airfoil assembly includes the fan blade.

The turbine engine of any preceding clause, wherein the body includes a composite material, and the tip cap includes a metallic material.

The composite airfoil assembly of any preceding clause, wherein the body includes a composite material, and the tip cap includes a metallic material.

The airfoil assembly of any preceding clause, wherein the body includes a composite material, and the tip cap includes a metallic material.

The unducted turbine engine of any preceding clause, wherein the body includes a composite material, and the tip cap includes a metallic material.

What is claimed is:

1. A composite airfoil assembly for a turbine engine, the turbine engine having a fan section, a compressor section, a combustion section, and a turbine section in serial flow arrangement, the composite airfoil assembly comprising:

an outer wall extending between a leading edge and a trailing edge in a chordwise direction and between a root and a tip in a spanwise direction, the outer wall defining a pressure side and a suction side, and defining a camber line extending equidistant between the pressure side and the suction side;

a composite body at least partially defining the outer wall and terminating at a distal end; and a tip cap defining at least a portion of the outer wall and extending axially over at least a portion of the composite body corresponding to the pressure side and the suction side, and radially over at least a portion of the composite body, the tip cap comprising a plurality of ribs formed along at least one of the outer wall or a surface of the tip cap extending along a respective portion of the composite body, each rib of the plurality of ribs defining a continuous protrusion formed along a respective portion of the tip cap that extends radially towards or away from a respective portion of the tip cap, with respect to the camber line.

2. The composite airfoil assembly of claim 1, wherein at least one rib of the plurality of ribs is an external rib extending along the outer wall radially away from the respective portion of the tip cap, with respect to the camber line.

3. The composite airfoil assembly of claim 2, wherein the external rib at least partially defines the tip.

4. The composite airfoil assembly of claim 3, wherein the tip cap comprises a forward face and an aft face, and the external rib extends continuously between the forward face and the aft face.

5. The composite airfoil assembly of claim 2, wherein the external rib is included in a plurality of external ribs, with at least two external ribs of the plurality of external ribs being spaced in the spanwise direction with respect to one another.

6. The composite airfoil assembly of claim 2, wherein the external rib extends along a reference line in the chordwise direction.

7. The turbine engine of claim 6, wherein the reference line forms a non-zero angle with respect to a straight line intersecting the reference line and extending in the chordwise direction.

8. The composite airfoil assembly of claim 7, wherein the non-zero angle is greater than or equal to −30 degrees and less than or equal to 30 degrees.

9. The composite airfoil assembly of claim 1, wherein the tip cap extends between a forward face and an aft face, and at least one rib of the plurality of ribs extends continuously between the forward face and the aft face.

10. The composite airfoil assembly of claim 9, wherein the tip cap extends between a forward face and an aft face, and the at least one rib extends less than an entirety of a distance between the forward face and the aft face.

11. The composite airfoil assembly of claim 1, wherein the tip cap is formed as a unitary body extending continuously along the tip between the suction side and the pressure side.

12. The composite airfoil assembly of claim 1, wherein the body includes a composite material, and the tip cap includes a metallic material.

13. The composite airfoil assembly of claim 1, wherein the plurality of ribs are axially spaced from the leading edge with respect to the camber line.

* * * * *